US012686494B2

(12) United States Patent
Oqab et al.

(10) Patent No.: US 12,686,494 B2
(45) Date of Patent: Jul. 21, 2026

(54) SYSTEM AND METHODS FOR MOBILE TOWING AND LIFTING PLATFORMS

(71) Applicant: Oqab Dietrich Induction Inc., Kitchener (CA)

(72) Inventors: Haroon B. Oqab, Kitchener (CA); George B. Dietrich, Kitchener (CA)

(73) Assignee: Oqab Dietrich Induction Inc., Kitchener (CA)

( * ) Notice: Subject to any disclaimer, the term of this patent is extended or adjusted under 35 U.S.C. 154(b) by 292 days.

(21) Appl. No.: 18/269,489

(22) PCT Filed: Dec. 23, 2021

(86) PCT No.: PCT/CA2021/051885
§ 371 (c)(1),
(2) Date: Jun. 23, 2023

(87) PCT Pub. No.: WO2022/133614
PCT Pub. Date: Jun. 30, 2022

(65) Prior Publication Data
US 2024/0059415 A1 Feb. 22, 2024

Related U.S. Application Data

(60) Provisional application No. 63/129,775, filed on Dec. 23, 2020.

(51) Int. Cl.
*B64D 3/00* (2006.01)
*B60D 1/62* (2006.01)
(Continued)

(52) U.S. Cl.
CPC ................. *B64D 3/00* (2013.01); *B60D 1/62* (2013.01); *B60L 53/10* (2019.02); *B64B 1/40* (2013.01);
(Continued)

(58) Field of Classification Search
CPC .. B64B 1/40; B64D 3/00; B64U 50/32; B64U 2101/00; B60D 1/62; B60L 53/10
See application file for complete search history.

(56) References Cited

U.S. PATENT DOCUMENTS 3,834,655 A * 9/1974 Crosby, Jr. ............. B64D 39/00
244/33
4,361,295 A * 11/1982 Wenzel .................... B64B 1/40
244/33
(Continued)

FOREIGN PATENT DOCUMENTS

CN 105923152 A 9/2016
CN 107738750 A 2/2018
(Continued)

OTHER PUBLICATIONS

CIPO as International Searching Authority, International Search Report and Written Opinion for PCT/CA2021/051885, dated Mar. 21, 2022.

*Primary Examiner* — Tye William Abell
(74) *Attorney, Agent, or Firm* — Own Innovation; James W. Hinton; Osman Ismaili

(57) ABSTRACT

A mobile towing and lifting system and associated methods, comprising a retractable tug, coupled to an aerial vehicle, wherein the tug is configured to transfer electrical power and data to and from the aerial vehicle. The aerial vehicle may comprise an airship, multirotor aircraft, fixed wing aircraft, buoyant aircraft or a combination of the like. The mobile towing and lifting system may be applied to wireless charging, and aerial logistics applications.

22 Claims, 24 Drawing Sheets

(51) Int. Cl.
*B60L 53/10* (2019.01)
*B64B 1/40* (2006.01)
*B64U 50/32* (2023.01)
*B64U 50/39* (2023.01)
*B64U 101/00* (2023.01)

(52) U.S. Cl.
CPC ............. *B64U 50/32* (2023.01); *B64U 50/39* (2023.01); *B64U 2101/00* (2023.01)

(56) References Cited

U.S. PATENT DOCUMENTS

| | | | | | |
|---|---|---|---|---|---|
| 4,534,525 | A | * | 8/1985 | Bliamptis | B64B 1/58 |
| | | | | | 244/30 |
| 2012/0234964 | A1 | * | 9/2012 | Heppe | B64U 50/34 |
| | | | | | 244/30 |
| 2012/0312918 | A1 | * | 12/2012 | Heppe | B64B 1/00 |
| | | | | | 244/30 |
| 2014/0158818 | A1 | * | 6/2014 | Lewis | B64B 1/10 |
| | | | | | 244/30 |
| 2016/0031564 | A1 | * | 2/2016 | Yates | B64U 10/25 |
| | | | | | 307/9.1 |
| 2020/0010193 | A1 | * | 1/2020 | Alexander | B64U 10/16 |

FOREIGN PATENT DOCUMENTS

| | | | | | |
|---|---|---|---|---|---|
| EP | 2686238 | A1 | 1/2014 | | |
| EP | 3548383 | A1 | 10/2019 | | |
| WO | WO-2012125639 | A1 | * 9/2012 | .............. | B64B 1/32 |
| WO | 2020145677 | A1 | 7/2020 | | |

* cited by examiner

2100

2102  Providing an aircraft comprising a retractable tug

2104  Placing the retractable tug in the extended position

2106  Connecting the retractable tug to a charging target

2108  Disconnecting the retracting tug from the charging target

2110  Placing the retractable tug in the retracted position

SYSTEM AND METHODS FOR MOBILE TOWING AND LIFTING PLATFORMS

TECHNICAL FIELD

The embodiments disclosed herein relate to mobile towing and lifting platforms, and, in particular to systems and methods of mobile towing and lifting with aerial vehicles.

INTRODUCTION

Various classes of aircraft may possess different advantages and capabilities. For example, rotor-based aircraft, such as multirotor aircraft or helicopters, may allow for hovering and high maneuverability, while airships may allow for hovering with minimal energy expenditure.

Coupling aircraft together may result in a combined aircraft with the combined benefits of each constituent aircraft. This may increase the number of possible use cases of each class of aircraft.

While coupling aircraft together may result in an aircraft with the combined benefits of each constituent aircraft, current methods of coupling in-flight aircraft are limited in capability and provide little flexibility and inter-vehicle operability.

Similarly, certain aircraft may interact with ground-based objects. For example, aircraft may be used as aerial cranes or towing vehicles, for moving and lifting objects and/or removing unwanted objects. However, current methods of interfacing in-flight aircraft with ground-based objects are limited in capability, and provide little flexibility and inter-vehicle operability.

Accordingly, there is a need for new systems and methods for mobile towing and lifting aerial interfacing platforms.

SUMMARY

Described herein, according to an embodiment, is a system for mobile towing and/or lifting, the system comprising a retractable tug, coupled to an aerial vehicle, wherein the tug is configured to transfer electrical power to and from the aerial vehicle.

According to some embodiments, the tug comprises a first end and a second end, and each end is coupled to an aerial vehicle.

According to some embodiments, the first end of the tug is attached to an airship.

According to some embodiments, the first end of the tug is attached to an airship, and the second end of the tug is attached to an unmanned multirotor aircraft.

According to some embodiments, the unmanned multirotor aircraft is configured to tow the airship by applying a tensile force to the tug.

According to some embodiments, the unmanned multirotor aircraft is configured to tow the airship in any translational direction.

According to some embodiments, the first end of the tug is attached to a first unmanned multirotor aircraft, and the second end of the tug is attached to a second unmanned multirotor aircraft.

According to some embodiments, the first unmanned multirotor aircraft is configured to tow the second unmanned multirotor aircraft by applying a tensile force to the tug.

According to some embodiments, the first unmanned multirotor aircraft is configured to tow the second unmanned multirotor aircraft in any translational direction.

According to some embodiments, the tug is configured to attach to a fluid source, and the tug is configured to transfer fluid to and from the aerial vehicle.

According to some embodiments, the tug is configured to attach to an electricity source, such that electrical energy is transferred from the electricity source to the aerial vehicle through the tug.

According to some embodiments, the unmanned multirotor aircraft comprises a rectenna, wherein the rectenna is configured to receive wireless energy, convert the wireless energy to electrical energy, and transfer electrical energy to the airship through the tug.

According to some embodiments, the unmanned multirotor aircraft comprises a wireless power receiver, wherein the receiver is configured to receive wireless energy, convert the wireless energy to electrical energy, and transfer electrical energy to the airship through the tug.

According to some embodiments, the aerial vehicle is an unmanned multirotor aircraft, wherein the tug is configured to couple to an electricity source, such that electrical energy is transferred from the electricity source to the unmanned multirotor aircraft.

According to some embodiments, the unmanned multirotor aircraft is configured to transmit energy wirelessly.

According to some embodiments, the tug is coupled to a deployable structure.

According to some embodiments, the tug is coupled to an electric vehicle, such that electrical energy is transferred from the aerial vehicle to the electric vehicle through the tug.

According to some embodiments, the aerial vehicle comprises a deployable wing.

According to some embodiments, the deployable wing is a multi-chamber deployable wing.

According to some embodiments, the system further comprises a deployable sheet.

According to some embodiments, the deployable sheet comprises a wireless power receiver.

According to some embodiments, the unmanned multirotor aircraft is configured to transmit energy wirelessly to a rover vehicle.

According to some embodiments, the tug is coupled to a rover vehicle.

According to some embodiments, the aerial vehicle is configured to transfer electrical energy to the rover vehicle through the tug.

According to some embodiments, the tug is coupled to a towing payload.

According to some embodiments, the system further comprises a microwave energy beam, wherein the unmanned multirotor aircraft is within the microwave energy beam, wherein the wireless energy comprises the microwave energy beam.

According to some embodiments, the system further comprises at least one gas bag.

According to some embodiments, the gas bag is coupled to the airship with a tug.

According to some embodiments, the gas bag is coupled to the unmanned multirotor aircraft with a tug.

According to some embodiments, the airship comprises a wireless power receiver.

According to some embodiments, the aerial vehicle comprises a Magnus-effect based unmanned aerial vehicle.

According to some embodiments, the tug is configured to transfer data to and from the aerial vehicle.

Described herein, according to an embodiment, is a method of mobile towing, the method comprising providing an aircraft comprising a retractable tug, the retractable tug comprising a retracted position and extended position, wherein the retractable tug is provided in the retracted position, placing the retractable tug in the extended position and connecting a towing payload to the retractable tug.

According to some embodiments, the aircraft is provided at altitude.

According to some embodiments, the method further comprises placing the retractable tug in the retracted position after connecting the towing payload to the retractable tug.

According to some embodiments, the aircraft is an airship.

According to some embodiments, the aircraft is an unmanned multirotor aircraft.

According to some embodiments, the aircraft is a fixed wing aircraft.

According to some embodiments, the aircraft is a combination multirotor and buoyant aircraft.

According to some embodiments, the aircraft is a combination fixed wing and buoyant aircraft.

Described herein is a method of mobile charging according to an embodiment, the method comprising providing an aircraft comprising a retractable tug, the retractable tug comprising a retracted position and extended position, wherein the retractable tug is provided in the retracted position, placing the retractable tug in the extended position and connecting the retractable tug to a charging target.

According to some embodiments, the aircraft is provided at altitude.

According to some embodiments, the method further comprises disconnecting the retracting tug from the charging target and placing the retractable tug in the retracted position.

According to some embodiments, the aircraft is an airship.

According to some embodiments, the aircraft is an unmanned multirotor aircraft.

According to some embodiments, the aircraft is a fixed wing aircraft.

According to some embodiments, the aircraft is a combination multirotor and buoyant aircraft.

According to some embodiments, the aircraft is a combination fixed wing and buoyant aircraft.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

4

Figure 8:
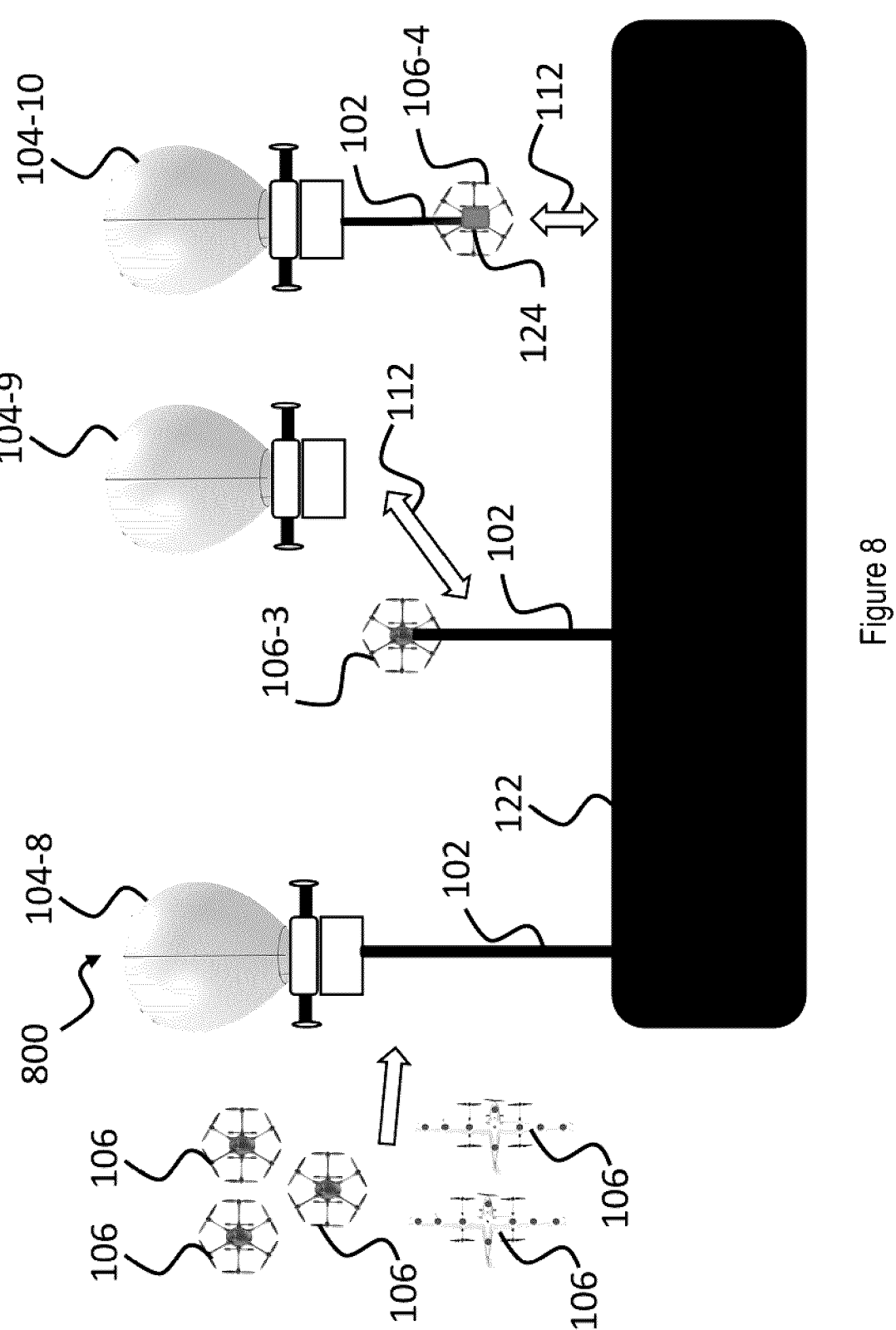
Figure 9:
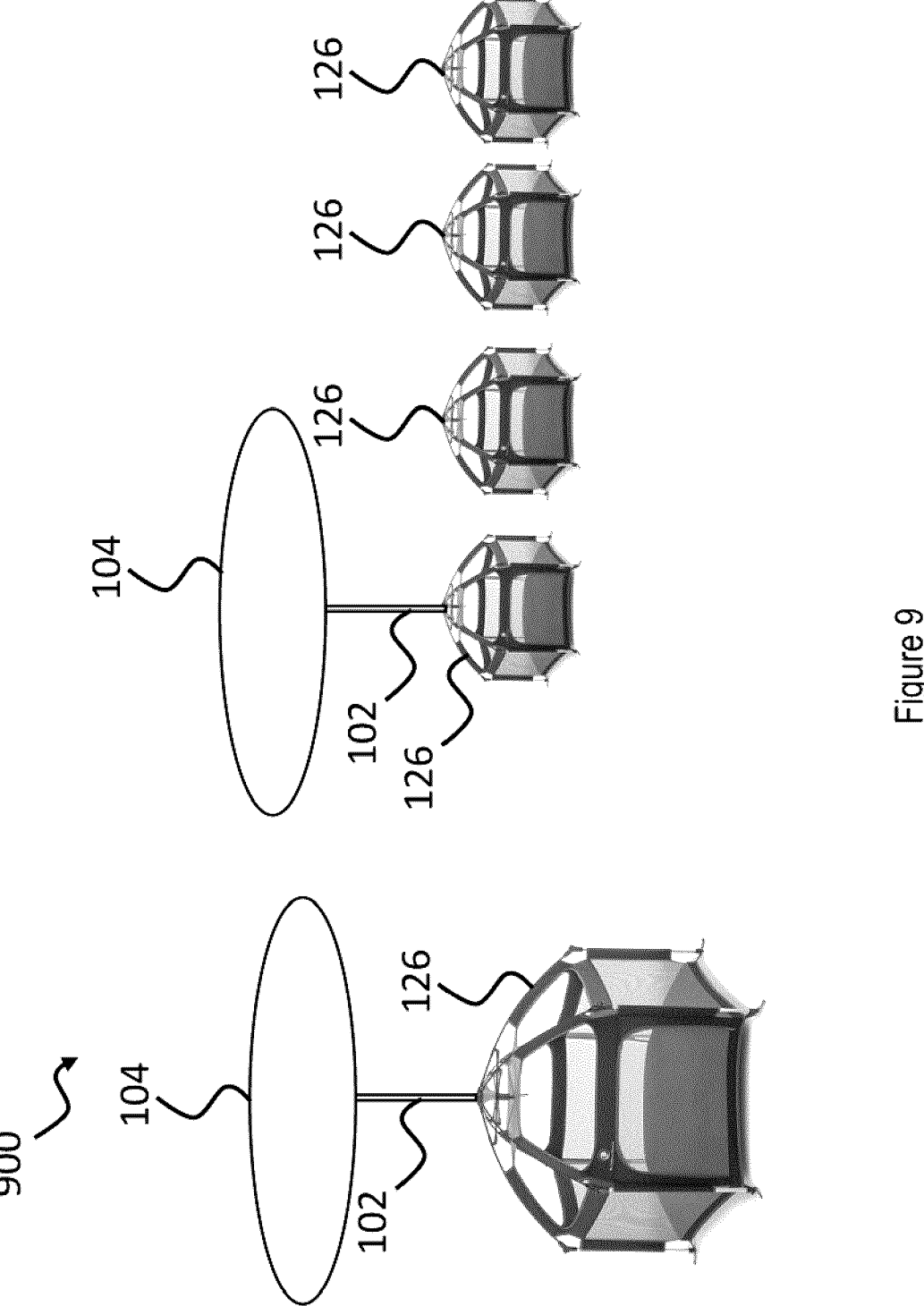
Figure 10:
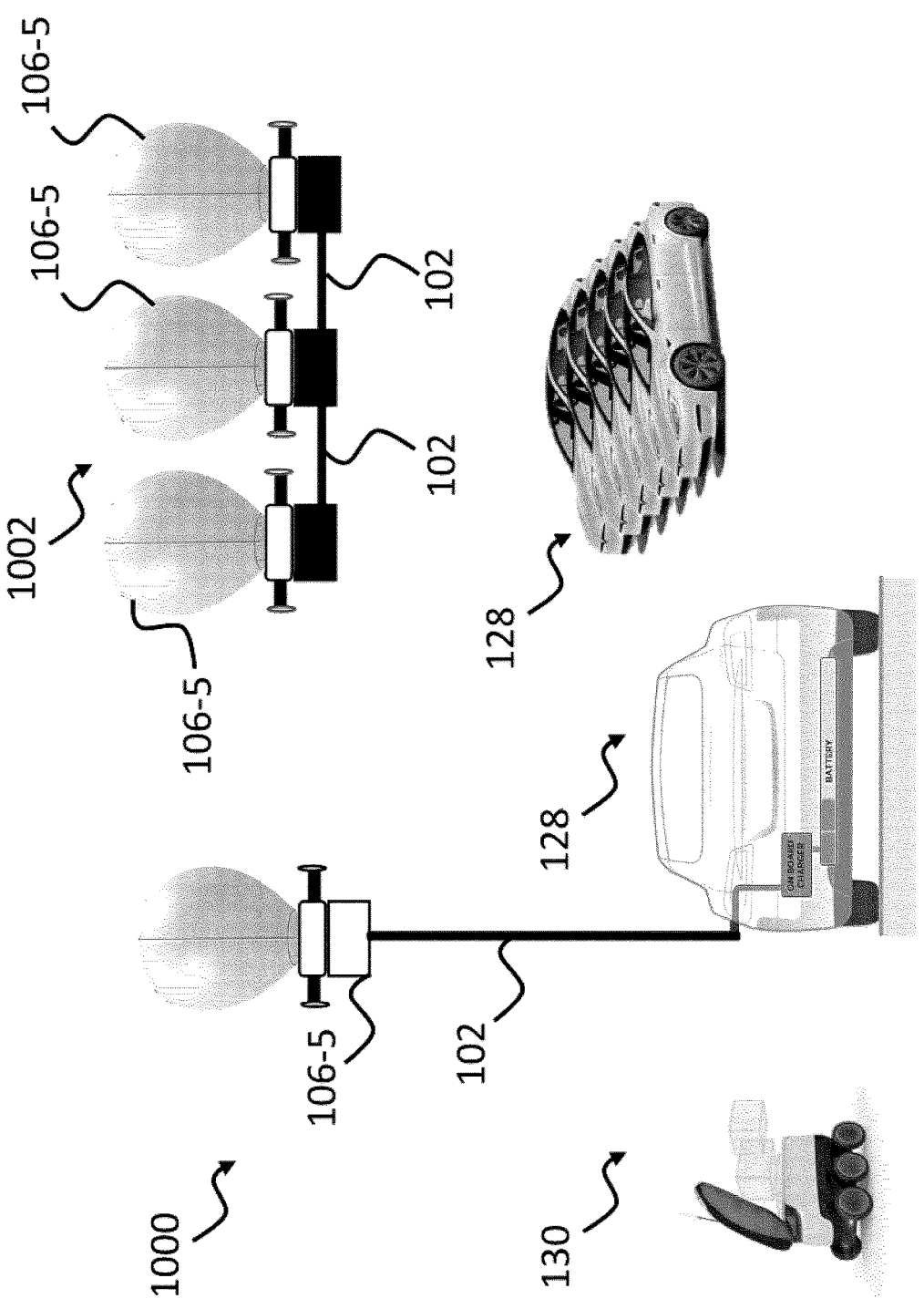
Figure 11:
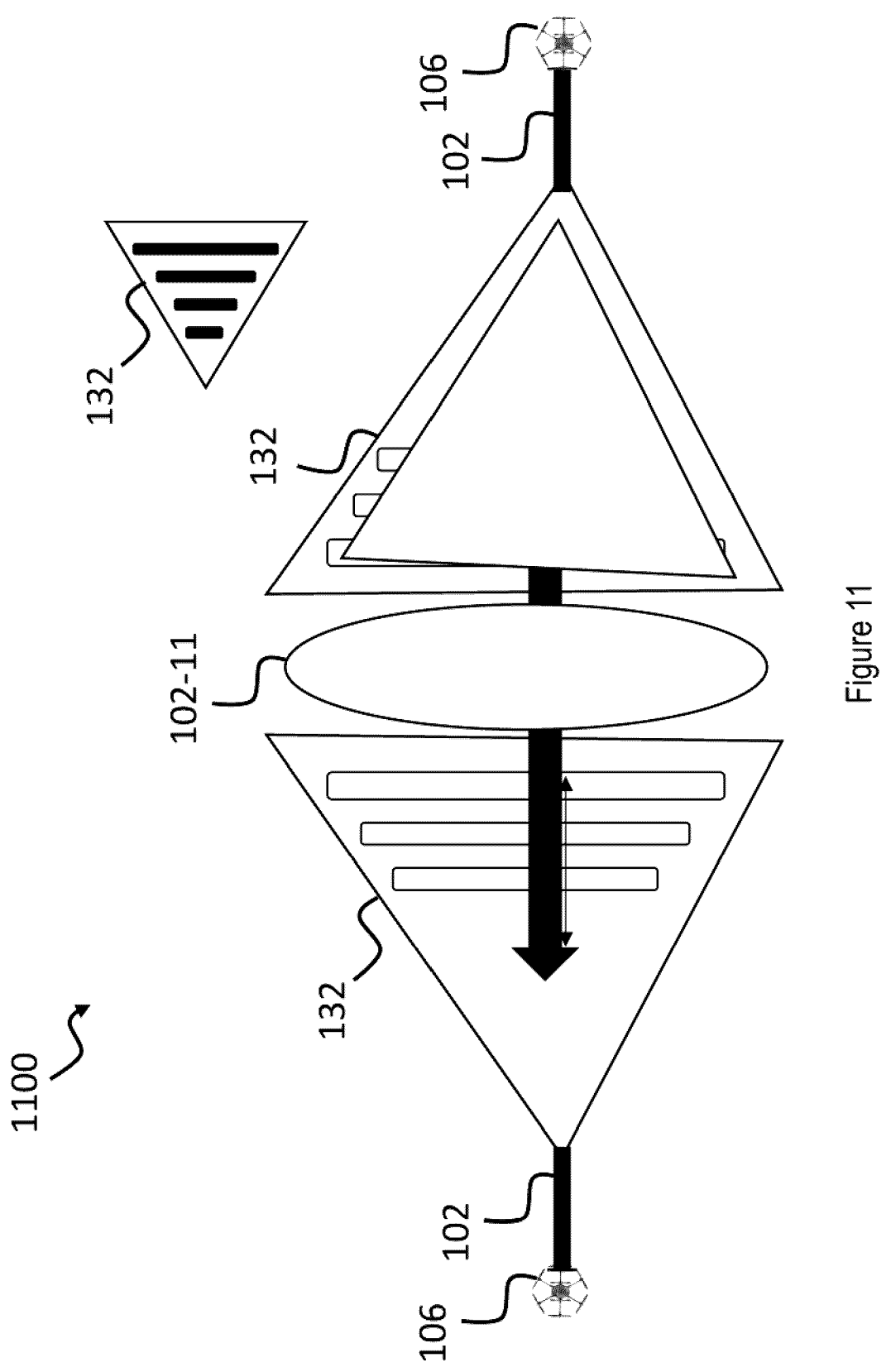
Figure 12:
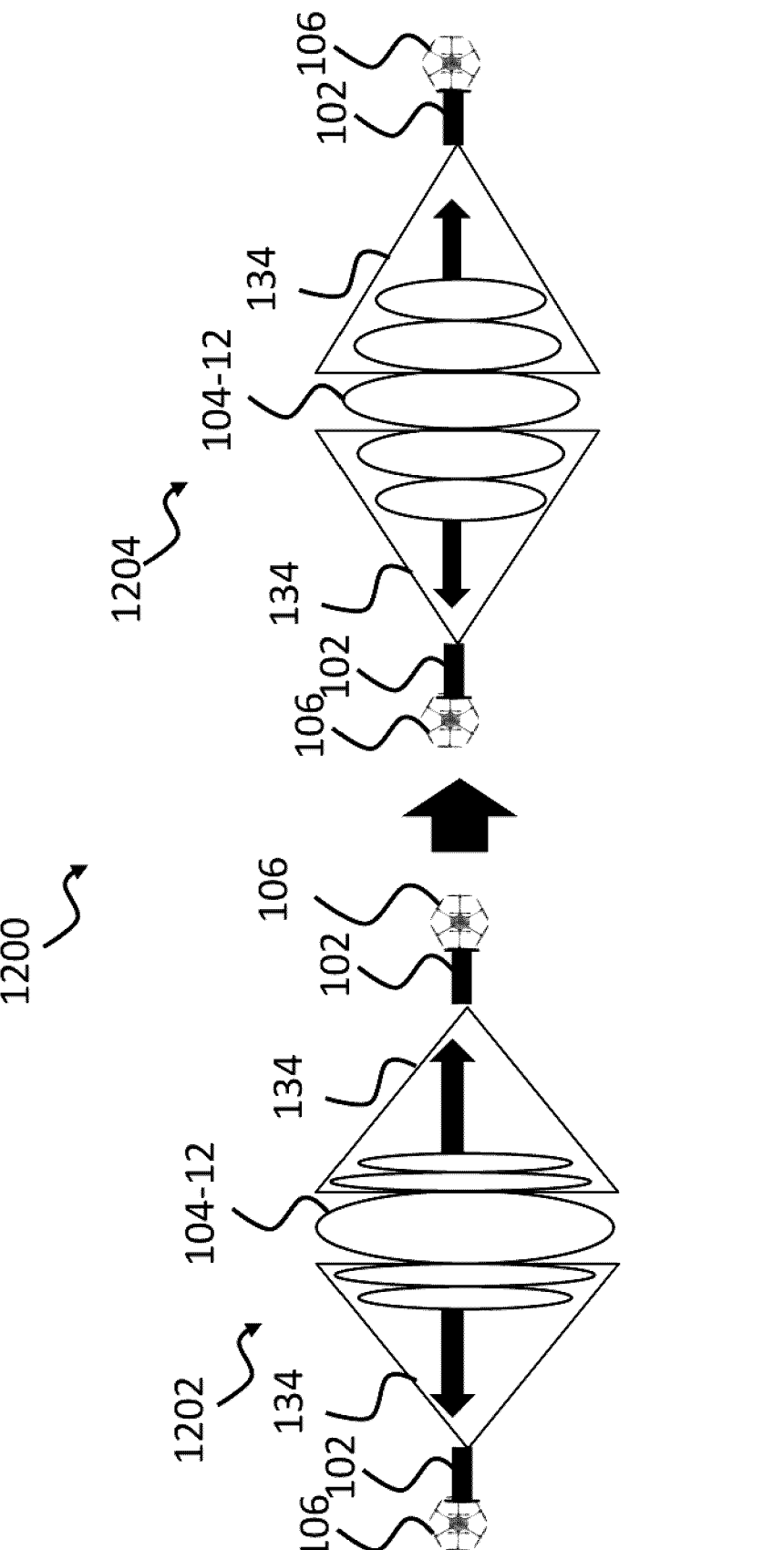
Figure 13:
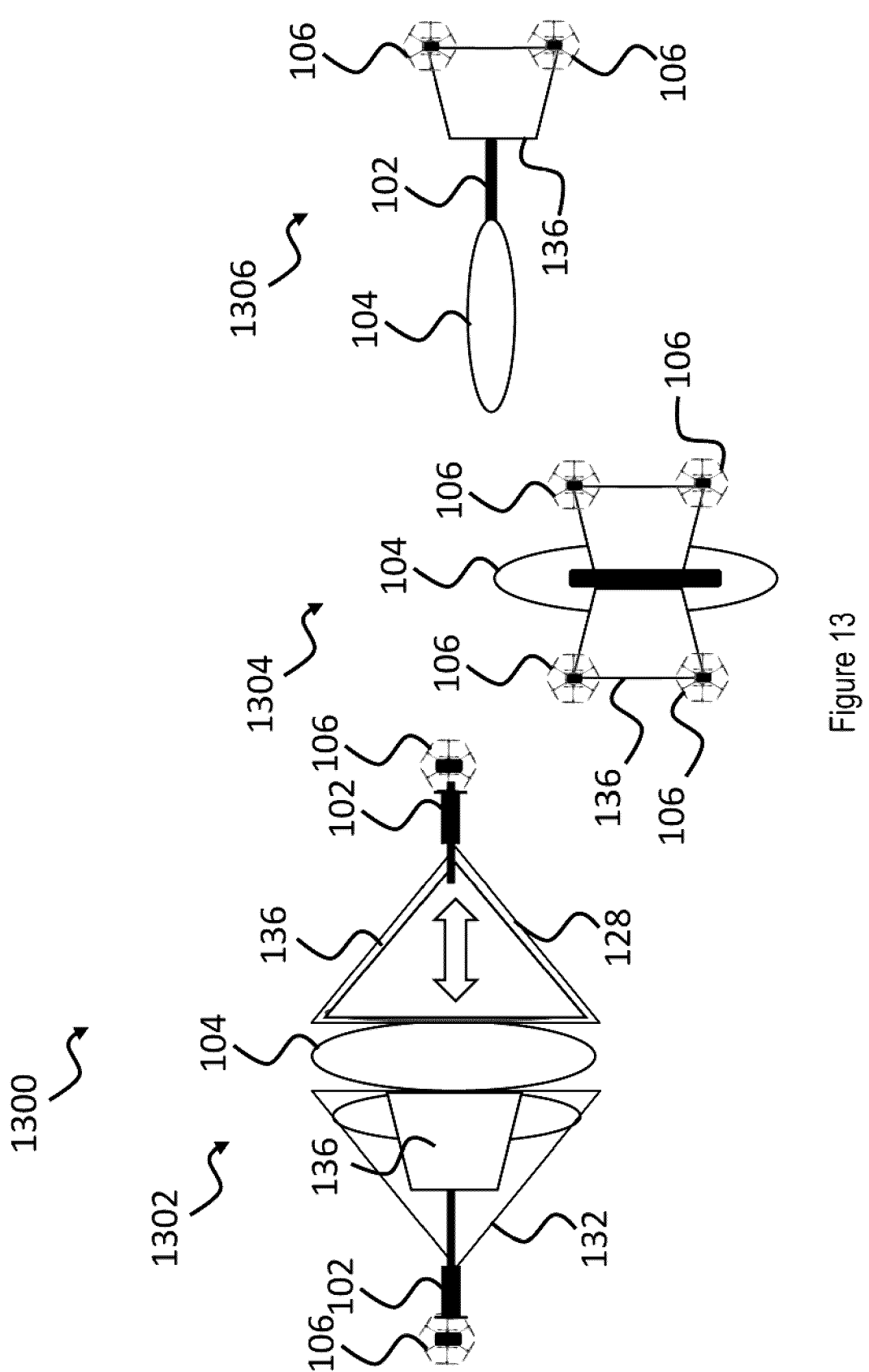
Figure 14:
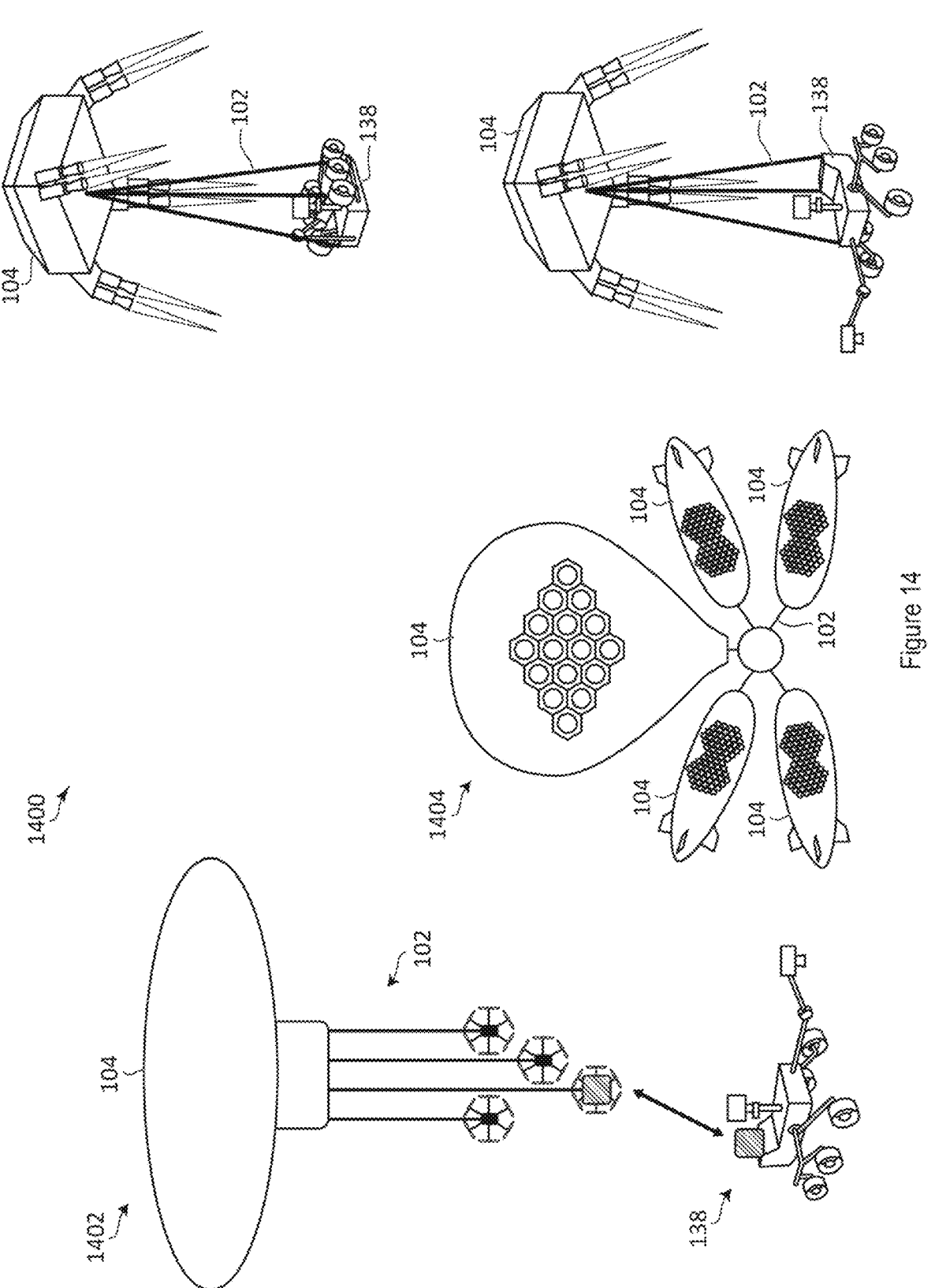
Figure 15:
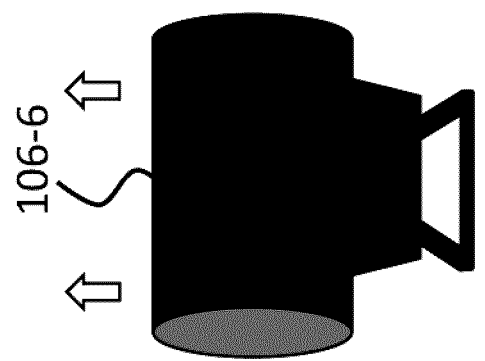
Figure 15:
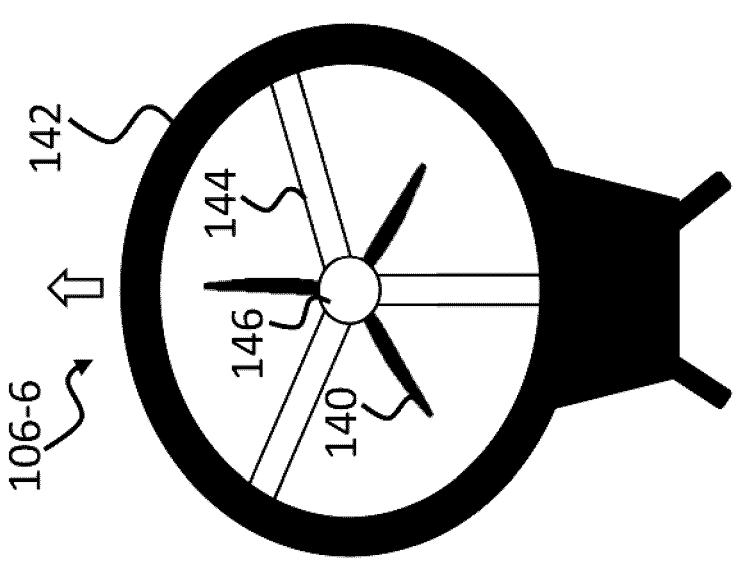
Figure 16:
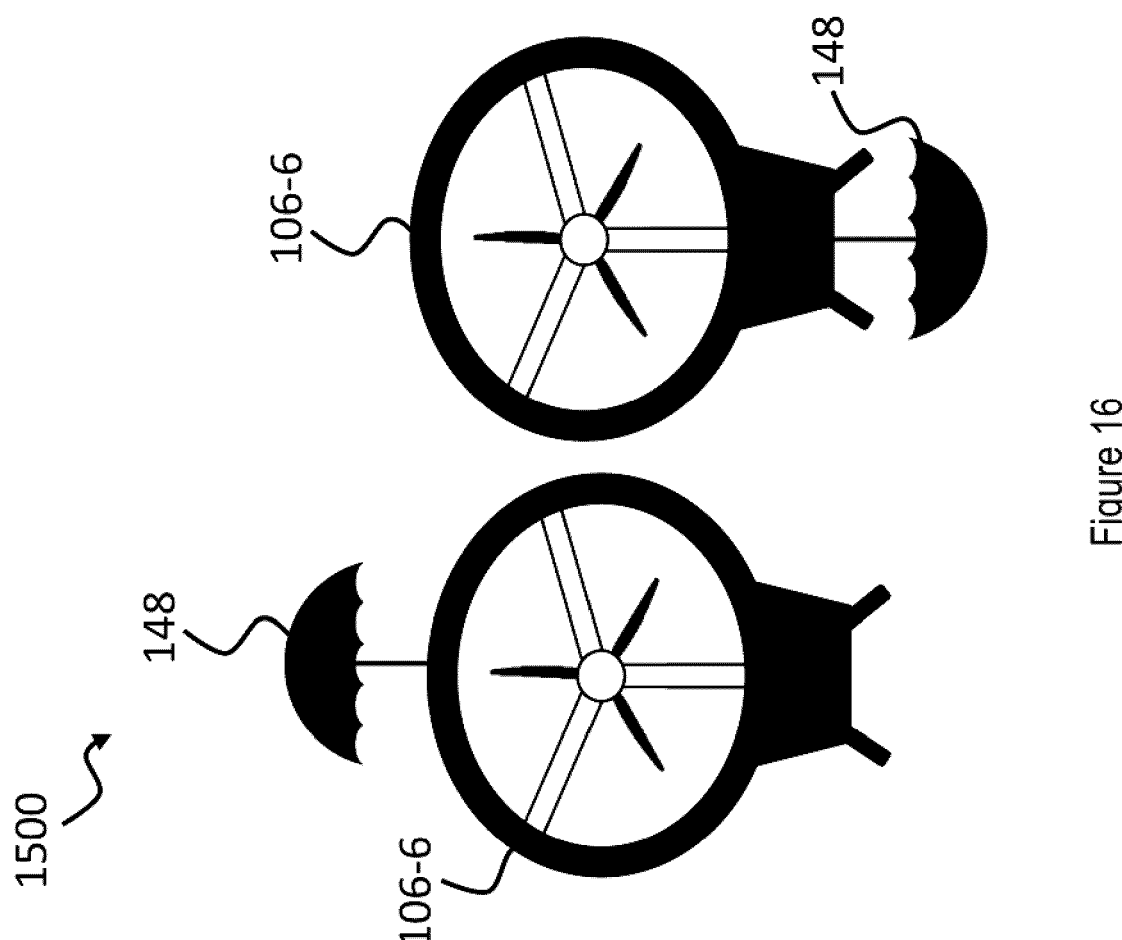
Figure 17:
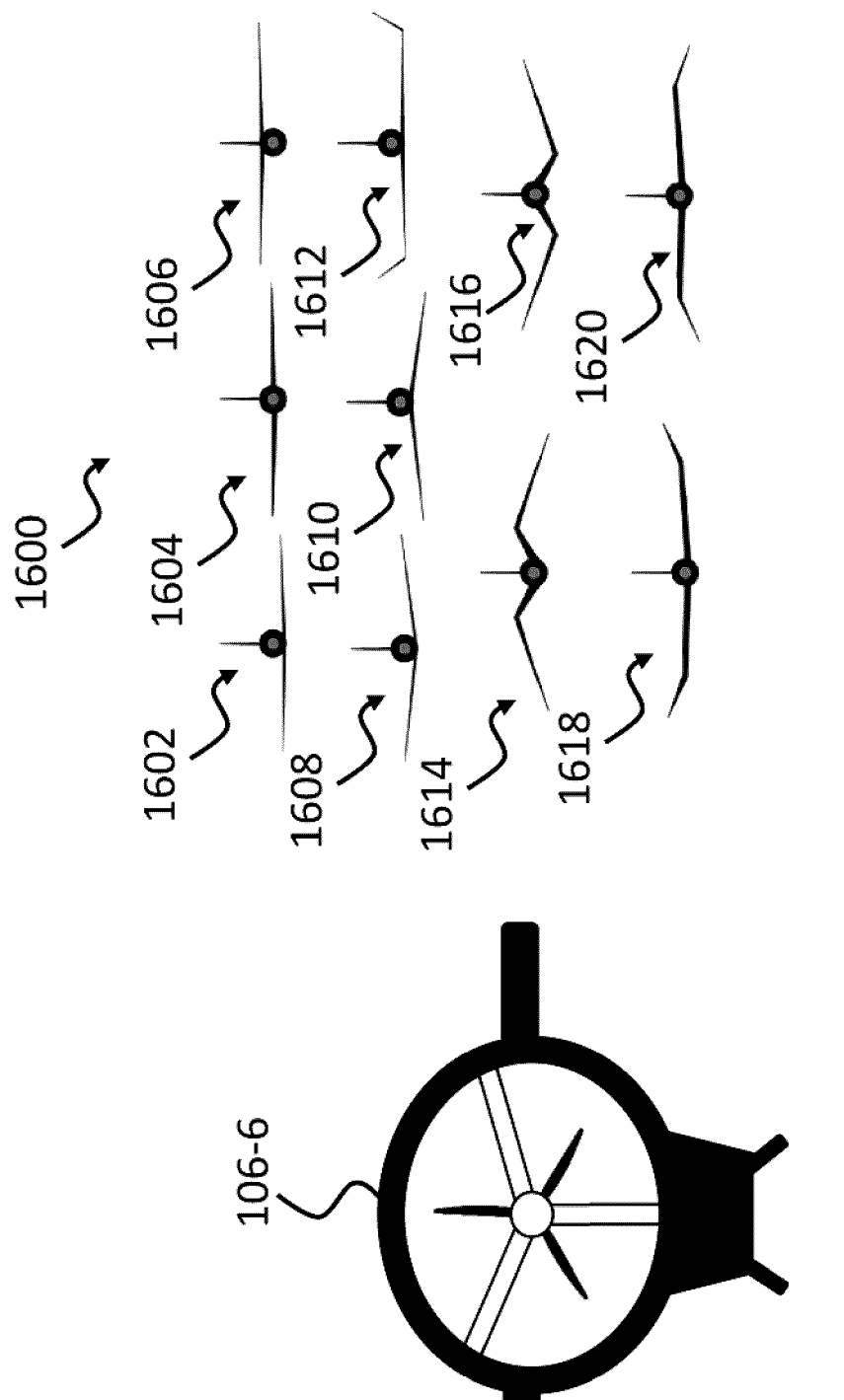
Figure 18:
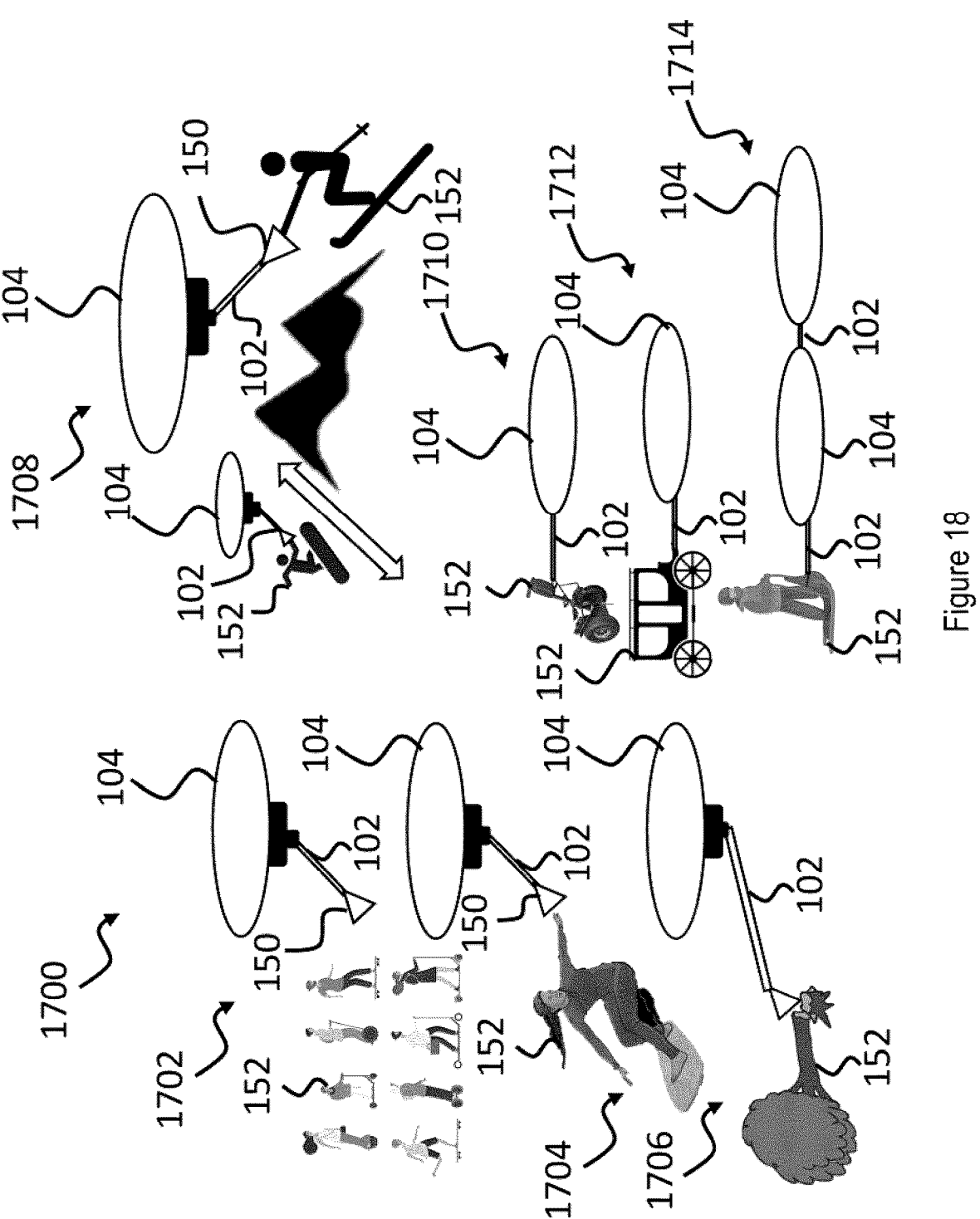
Figure 19:
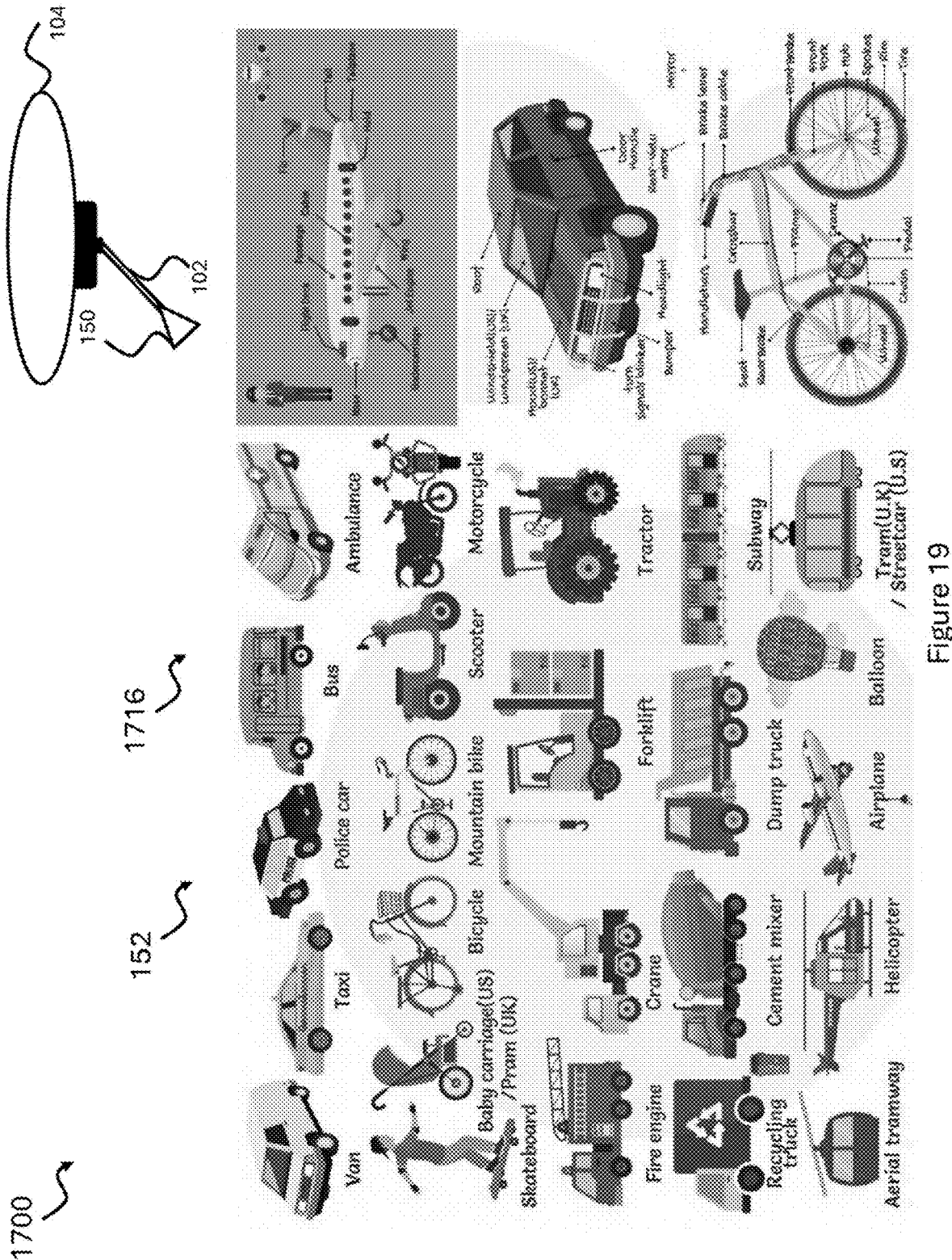
Figure 20:
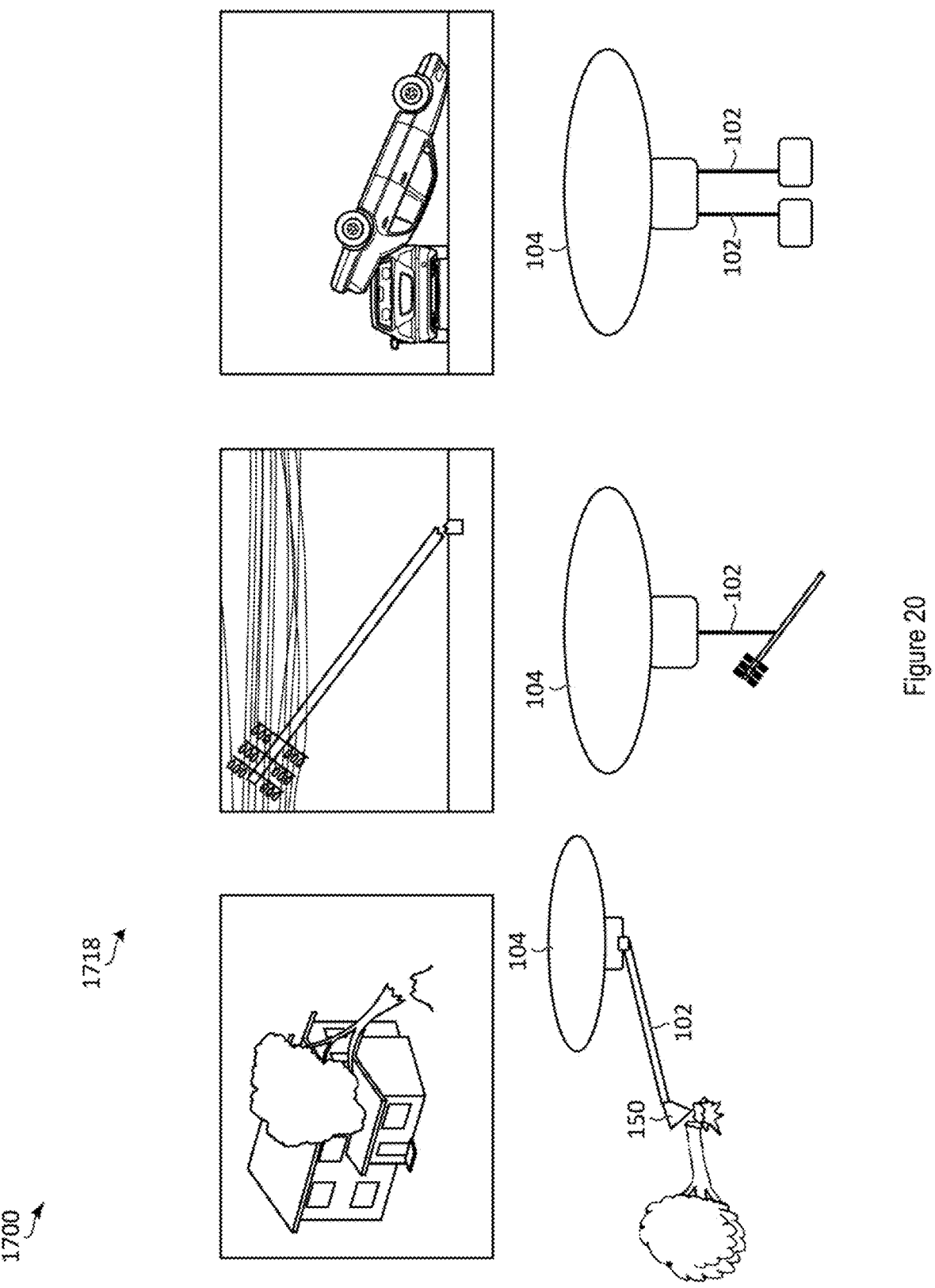
Figure 21:
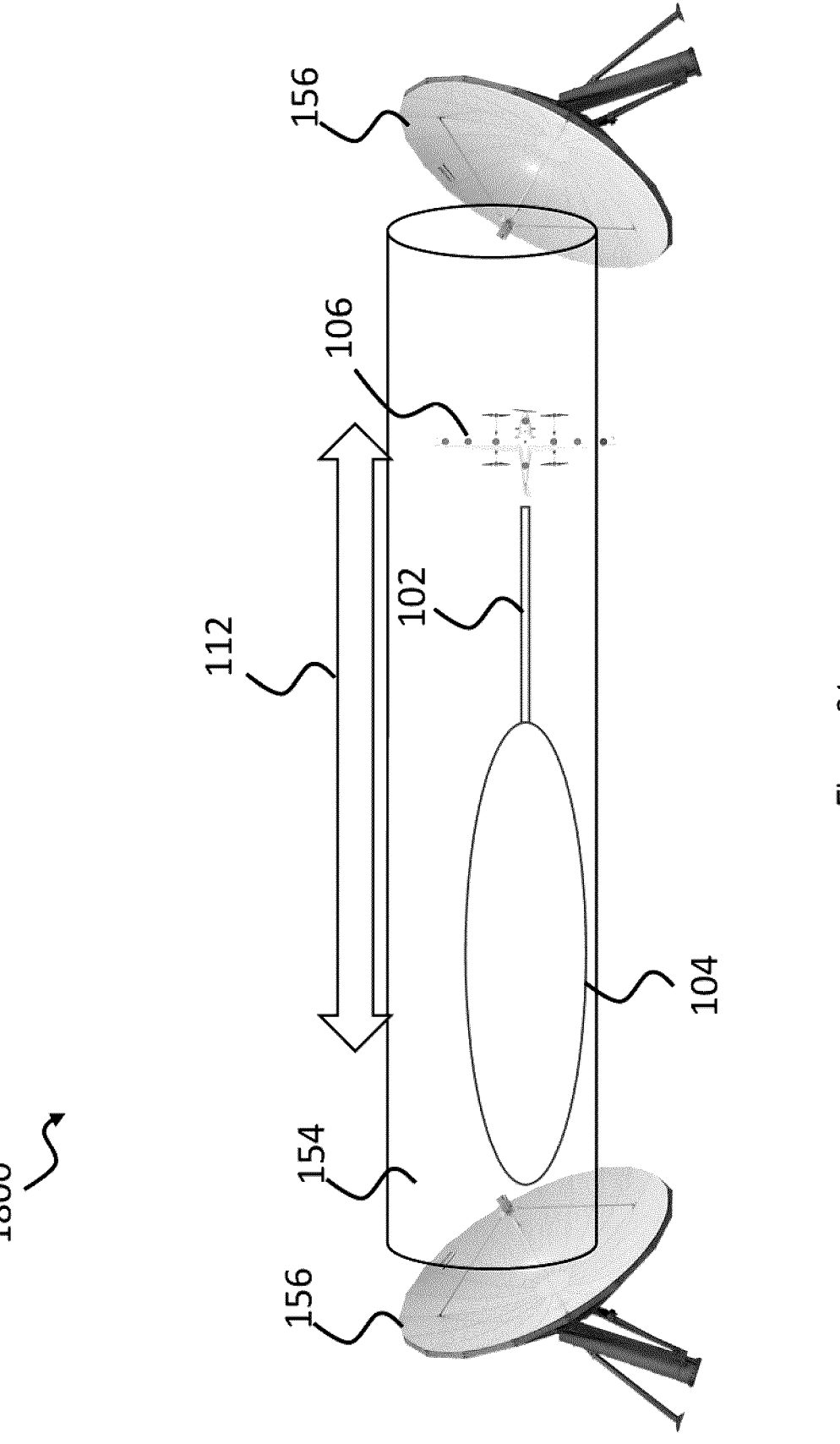
Figure 22:
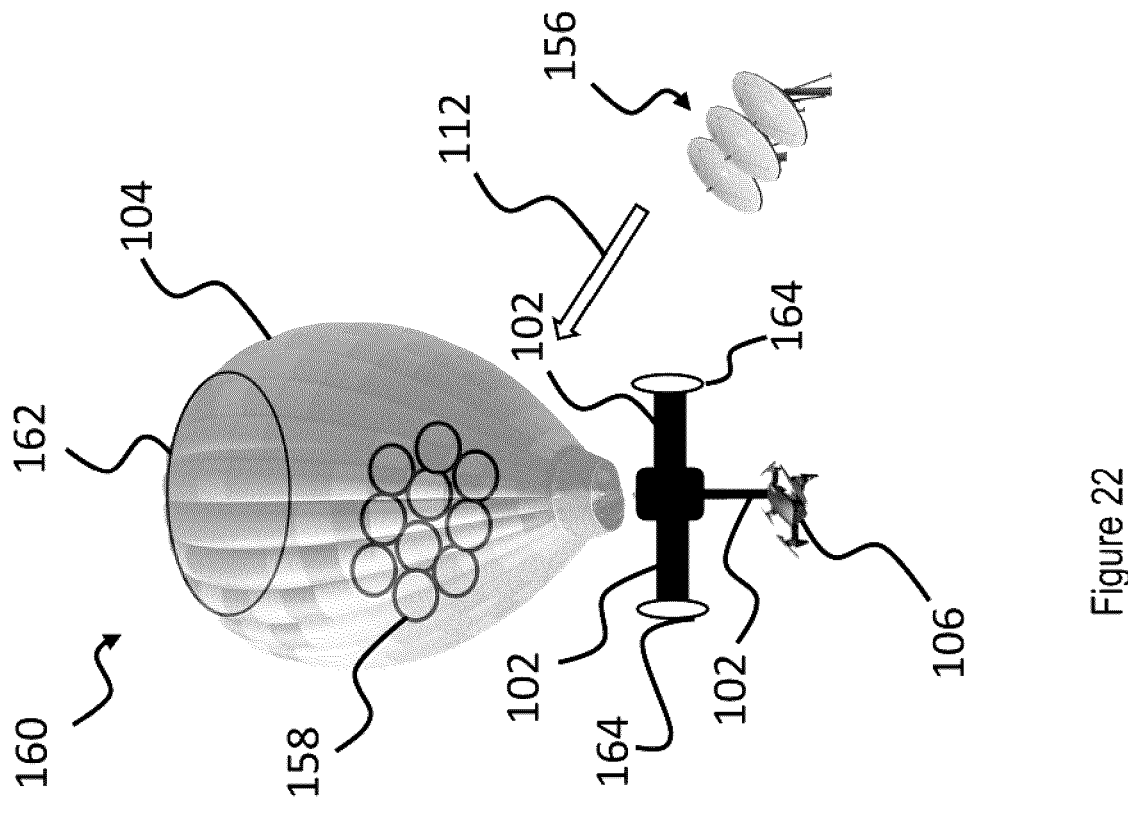
Figure 23:
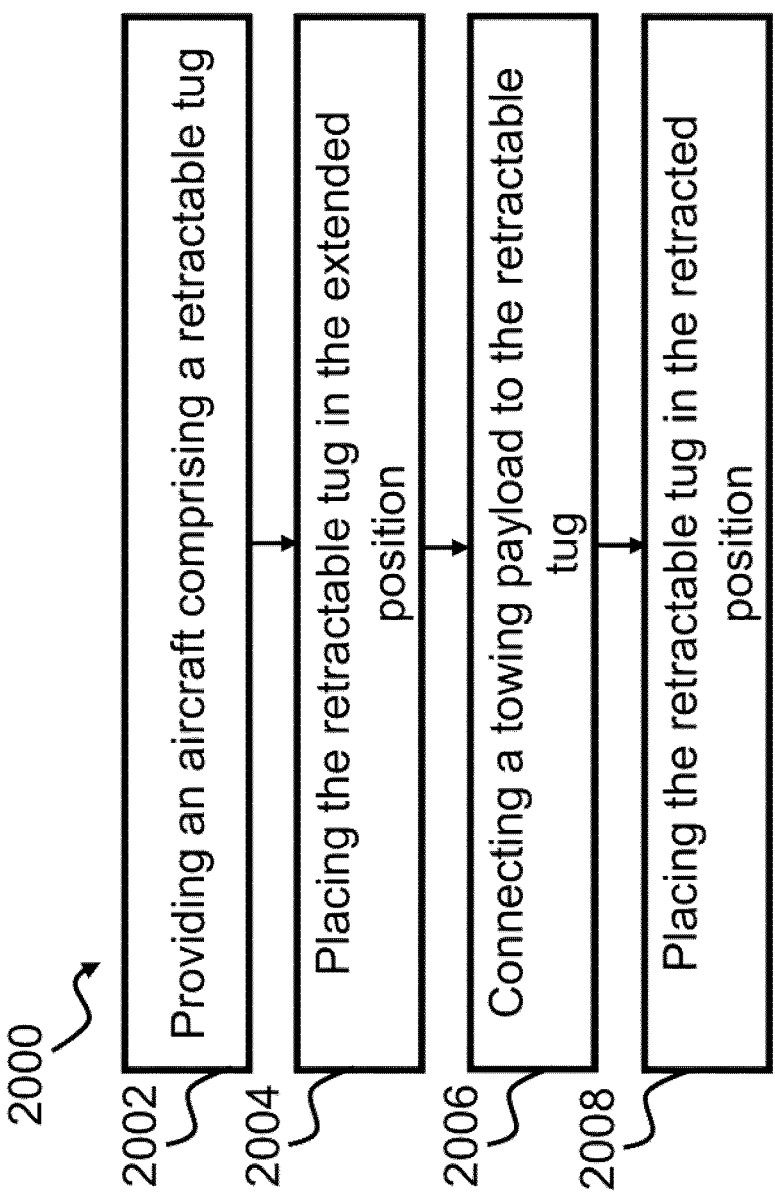
Figure 24:
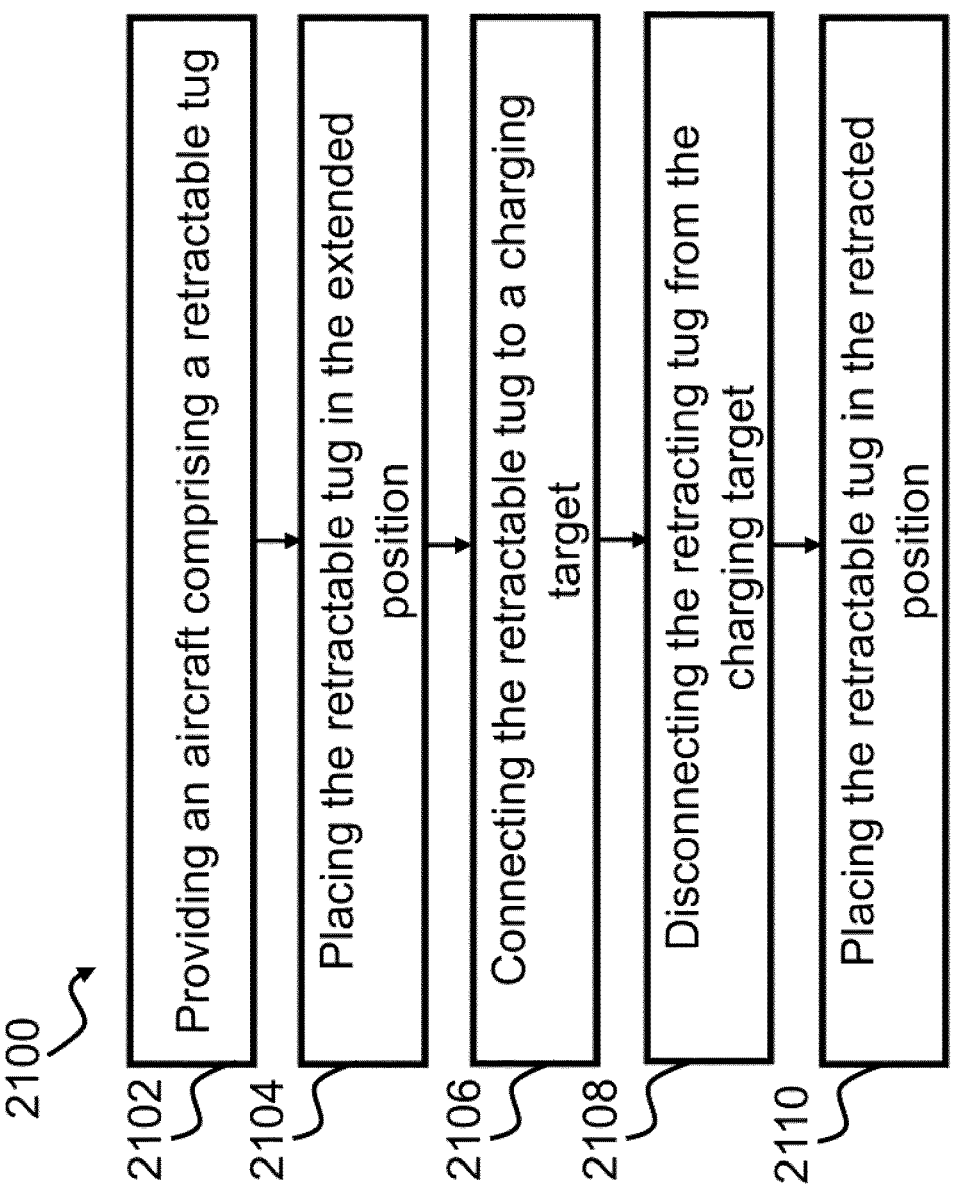

FIG. 8 is a schematic of a system for aircraft-based electric charging, according to another embodiment;

FIG. 9 is a schematic of a deployable structure system, according to an embodiment;

FIG. 10 is a schematic of a system for aircraft-based electric charging of electric vehicles, according to an embodiment;

FIG. 11 is a schematic of a deployable wing aircraft system, according to an embodiment;

FIG. 12 is a schematic of a multi-chamber deployable wing aircraft system, according to an embodiment;

FIG. 13 is a schematic of a deployable sheet aircraft system, according to an embodiment;

FIG. 14 is a schematic of a system for aerial vehicle-based rover deployment, according to an embodiment;

FIG. 15 is a schematic of a Magnus effect based aerial vehicle, according to an embodiment;

FIG. 16 is a schematic of a Magnus effect based aerial vehicle, according to another embodiment;

FIG. 17 is a schematic of a Magnus effect based aerial vehicle, according to another embodiment;

FIG. 18 is a schematic of a system for mobile towing and lifting, according to another embodiment;

FIG. 19 is a schematic of a system for mobile towing and lifting, according to another embodiment;

FIG. 20 is a schematic of a system for mobile towing and lifting, according to another embodiment;

FIG. 21 is a schematic of a system for aircraft beam riding, according to an embodiment;

FIG. 22 is a schematic of a hybrid airship system, according to an embodiment;

FIG. 23 is a flow chart, depicting a method of mobile towing and lifting, according to an embodiment; and FIG. 24 is a flow chart, depicting a method of aircraft based mobile charging, according to an embodiment.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Provided herein are systems and methods for producing and operating a standard mobile towing and/or lifting platform.

The platforms may comprise a retractable tether or "tug" system which may be configured to attach to a plurality of vehicles through a standardized interface. The tug may comprise a relatively thin and long structure, wherein the length of the structure is much greater than the width or thickness, like a rope. The tug may be of a material and physical design enabling a large tensile force to be tolerated by the tug. The tug may provide for data and electrical power transmission between endpoints of the tether. Such capabilities may be enabled through the presence of at least one electrical conductor and/or waveguide within the tug.

Such a standard tug system may enable the mobile towing platform described herein to be utilized in a number of varying applications. For example, unmanned aerial vehicles (UAVs) may be coupled to other vehicles, such as buoyant airships. Through the physical connections enabled by the tether system, unmanned aerial vehicles may tow the buoyant airships, and transfer data and electrical power to and from the buoyant airships. Such connections may result in coupled aircraft, which may allow the leverage of the benefits of each constituent aircraft. In other examples, various applications may be found for the mobile towing platform described herein.

In the disclosure herein, aircraft and aerial vehicle may be used interchangeably.

In the disclosure herein, unmanned aerial vehicle, and drone may be used interchangeably.

While the disclosure herein may describe rectenna—microwave receiver based wireless power systems, in any embodiment described herein, such a system may alternatively be implemented with other power transfer modalities such as inductive coupling, magnetic coupling, or other electromagnetic radiation (lasers, mm-wave, higher frequency microwaves) using receivers using coils, photovoltaics, thermophotovoltaics, and/or heat engines or the like.

Figure 1:
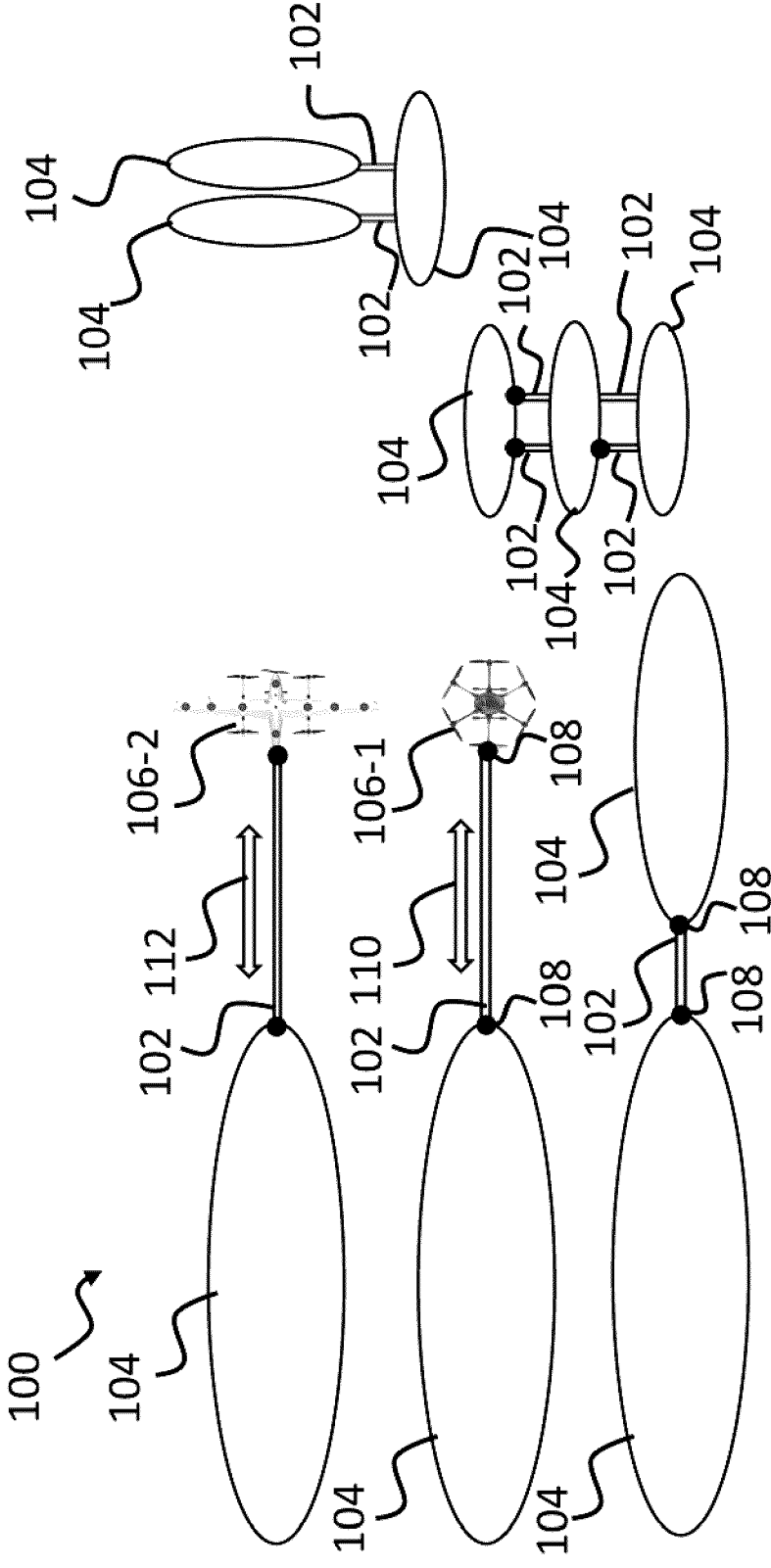
FIG. 1 is a schematic of a system for mobile towing and lifting, according to an embodiment.

Referring first to FIG. 1, pictured therein is a system 100 for airship towing and/or lifting, for logistics and operations purposes. System 100 may comprise at least one airship 104, at least one unmanned aerial vehicle (UAV) (106-1 and 106-2, collectively referred to as UAV 106) and at least one tug 102, which may connect each UAV 106 to each airship 104.

Tug 102 may comprise a flexible structure with a high tensile strength. The structure may comprise a steel or other metal cable, aramid fiber cable, a graphene or carbon nanomaterial based cable, and/or other composite cable. The cable may comprise a sufficient tensile strength, such that the tug 102 may connect two aerial vehicles, and allow one aerial vehicle to tow and/or the full mass of the other aerial vehicle. In some examples, the tensile strength of the tug 102 may vary depending on the application of the tug. For example, when the tug 102 is employed in a high mass towing application, the tensile strength may be relatively high. When the tug 102 is employed in less mechanically demanding applications, the tensile strength of tug 102 may be relatively low.

In some examples, tug 102 may be a rigid structure. In some examples, this rigid structure may comprise a telescoping metal tube structure, a solid section such as a hollow steel or aluminum section, or other rigid structure.

In some examples, tug 102 may comprise a retractable structure. In examples wherein tug 102 comprises a flexible structure, the flexible structure may be retracted into a storage area or device, and deformed into a shape that allows for space efficient storage. For example, in examples wherein tug 102 comprises a flexible steel cable, the cable-based tug may be rolled onto a reel for space efficient storage of the tug 102. The reel may be rolled for retraction. In such examples, the tug 102 may comprise a reel at either or both ends of the tug 102. In examples wherein tug 102 comprises a rigid structure, the structure may be configured such that tug 102 may be stored in a space efficient manner. For example, the tug 102 may be retracted telescopically for storage, or may comprise many hinged sections, that may be reconfigured into a smaller footprint for storage.

In some examples, tug 102 may provide for data transmission. Within tug 102, there may be a fiber optic cable, a conductor or set of conductors to enable data transmission across the tug 102. Any data transmission protocol known in the art may be applied to tug 102 for data transmission.

In some examples, tug 102 may provide for electrical power transmission. Within tug 102, there may be a conductor or set of conductors (e.g. a pair of conductors, hot and ground) to enable electrical power transmission across the tug 102. Any electrical power transmission protocol known in the art may be applied to tug 102 for electrical power.

Airship 104 may be any airship known in the art, or any vehicle capable of flight, wherein lift is provided through buoyancy (e.g. using a buoyant fluid such as hydrogen, helium or heated air or other fluids). Airship 104 may be manned or unmanned. Airship 104 may comprise a hot air balloon or dirigible.

Unmanned aerial vehicle 106 may be any UAV known in the art, or any vehicle capable of flight without a human pilot present within the vehicle during flight. UAV 106 may be a fixed wing aircraft 106-2 or a multirotor aircraft 106-1 or a combination of a fixed wing and multirotor aircraft, and/or a hybrid buoyant vehicle. UAV 106 may be remotely controlled e.g. through an RF communication link, or autonomously controlled, such as by an onboard computing device which may enable autonomous flight control.

Each end of tug 102 may comprise a connector 108. Connector 108 may be configured such that tug 102 may be connected to vehicles and structures autonomously. For example, no manual human interaction will be required in such examples. In some examples, connector 108 may be standardized, such that connector 108 may be applied to many use cases, and may interface with any other connector 108.

In examples wherein tug 102 provides electrical power and or data for transmission, each connector 108 may comprise corresponding connections to power and or data conductors, such that vehicles and structures tug 102 is connected to may form connections with the conductors through connector 108.

Element 110 demonstrates that the associated tug 102 may be retractable. Element 112 denotes that power and/or data transmission may occur across the tug.

In the example of FIG. 1, shown therein are various configurations of airship-UAV connections and airship-airship connections according to an embodiment. For example, an airship 104 may be coupled to and towed and/or lifted by either a fixed wing UAV 106-2 or multi-rotor UAV 106 or a combination of a fixed wing and multirotor aircraft and/or a hybrid buoyant vehicle. Two airships 104 may be coupled with a single tug 102. Three airships may be connected, wherein one central airship 104 is separately connected to two other airships, each connection comprising a single tug. Three airships may be coupled in a ladder configuration, wherein a first airship 104 is coupled to a second airship through two tugs 102, and the second airship 104 is coupled to a third airship 104 through two additional tugs 102.

Coupling a UAV, which may comprise high in air maneuverability characteristics, with an airship, which may remain airborne with little energy expenditure, may result in a coupled vehicle with advantages beyond either vehicle alone.

All of the configurations of system 100 may comprise towing and/or lifting systems, wherein any coupled vehicle may provide propulsive power to all other coupled vehicles.

Figure 2:
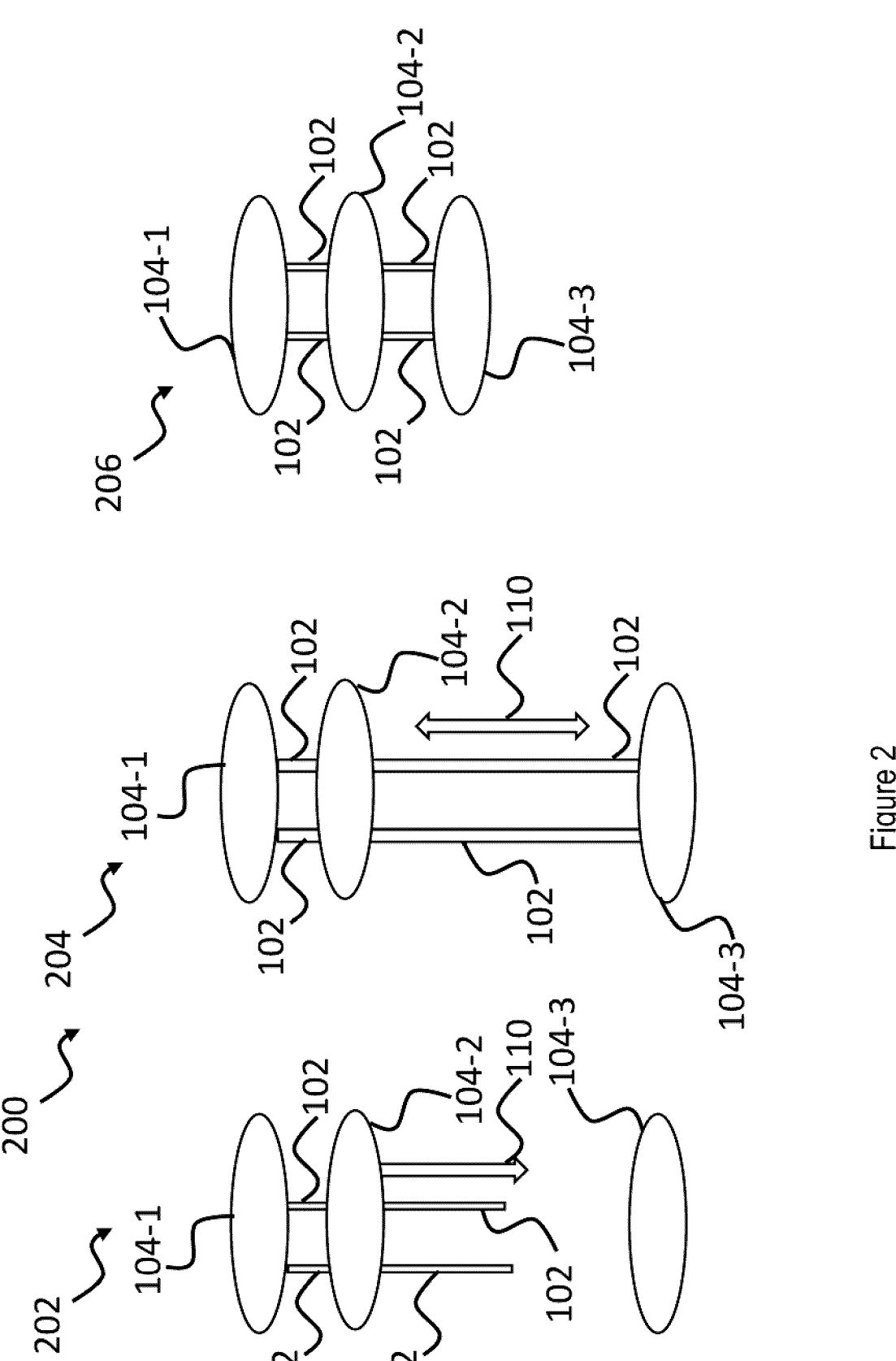
FIG. 2 is a schematic of a system for mobile towing and lifting, according to another embodiment.

Referring now to FIG. 2, pictured therein is system 200, an example application of the system 100 of FIG. 1, wherein the system 200 is applied to orbit raising and multi-altitude logistics. Description above in reference to system 100 may apply to system 200.

FIG. 2 depicts three stages of an orbit raising and multi-altitude logistics operation, including low altitude and/or high altitude operations, stage 202, stage 204 and stage 206, listed in sequential order. System 200 comprises 3 airships 104-1, 104-2 and 104-3. Airships 104-1, 104-2, 104-3 may be floating at a relatively high altitude. At stage 202, two of three airships 104-1 and 104-2 are connected by two tugs 102 each, with airship 104-1 floating at a higher altitude than airship 104-2. Tugs 102 may connect to each airship 104 with a connector (not pictured). Connected to airship 104-2 are another two available tugs 102, wherein one end of each tug 102 is connected to airship 104-2, while the two remaining tug 102 ends freely dangle. These dangling tugs 102 may be retractable, as depicted by element 110. A third airship 104-3 may float at an altitude below airships 104-1 and 104-2.

Referring now to stage 204, retractable free floating tugs 102 may be extended, such that they reach relatively far below airship 104-2. The tugs 102 may be extended until they reach airship 104-3 floating at a lower altitude. Once tugs 102 reach airship 104-3, they may be connected to airship 104-3.

Referring now to stage 206, retractable tugs 102 may be retracted, such that connected airship 104-3 is pulled upwards, towards the altitude at which airships 104-1 and 104-2 are floating. Such a method and system may be advantageous for storage of airships such as airship 104-3. By the application of the method shown in FIG. 2, airship 104-3 may be raised to a higher altitude to support a greater set of capabilities. Airship 104-3 may be stored at this higher altitude.

Alternatively, airships 104-1 and 104-2 may be configured to remain at a high altitude for longer periods of time. Airship 104-3, which may not possess the capability of reaching such an altitude, may be used to resupply airships 104-1 and 104-2 using this system and method. Airship 104-3 may be brought to the altitude of airships 104-1 and 104-2, such that goods stored within airship 104-3 may be provided to airships 104-1 and 104-2. Additionally, airships 104-1 and 104-2 may be supplied with electrical power, and or data from airship 104-3 through tugs 102.

Figure 3:
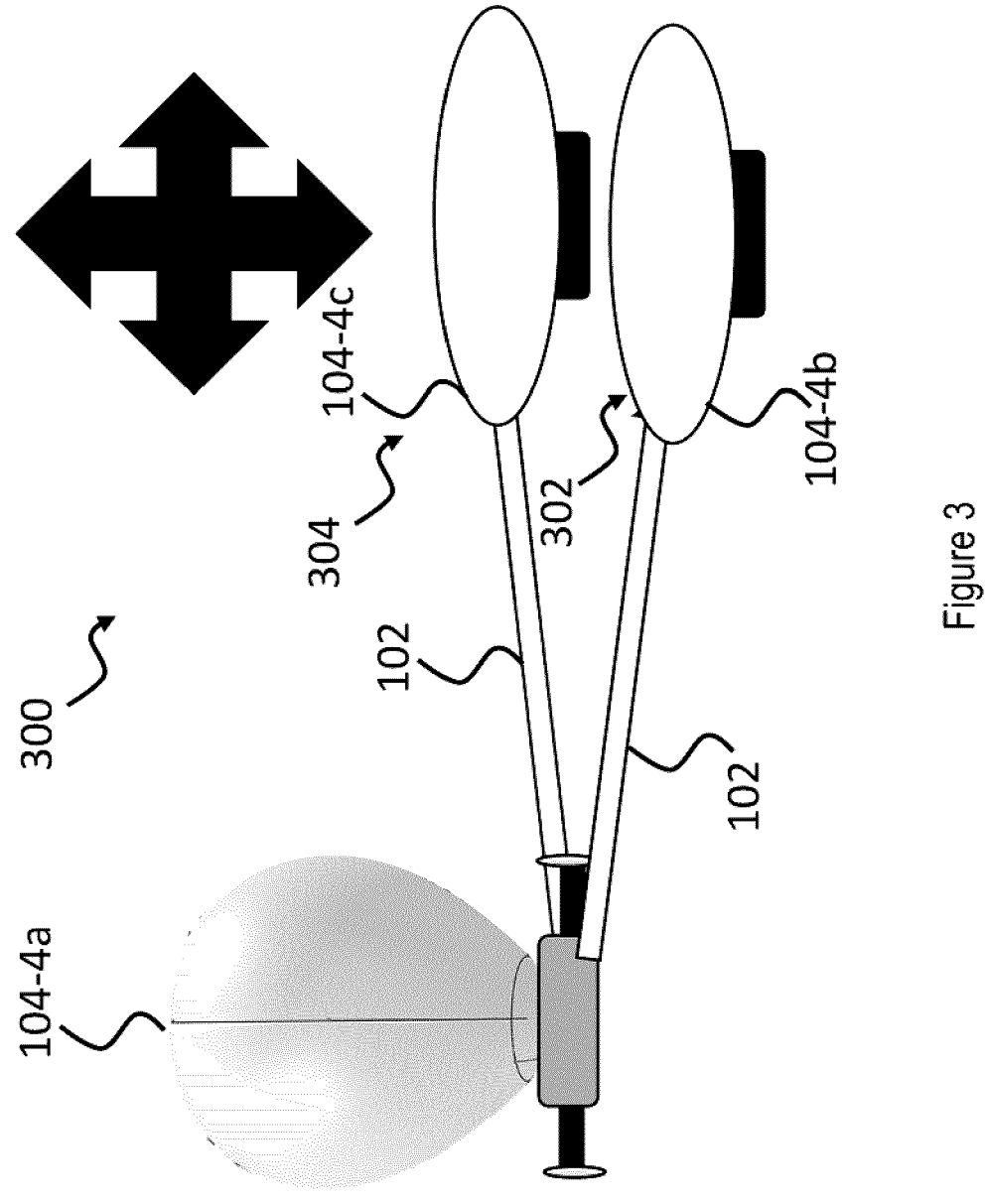
FIG. 3 is a schematic of a system for mobile towing and lifting, according to another embodiment.

Referring now to FIG. 3, pictured therein is an airship 104-4a and airship 104-4b and 104-4c, wherein each airship 104-4b, 104-4c occupies a separate position, position 302 and 304 respectively. Airship 104-4a may be connected to airship 104-4b and/or 104-4c with tug 102. Description above in reference to systems 100 and 200 may apply to system 300.

Airship 104-4a may comprise a generally larger airship than airships 104-4b and 104-4c. This relatively larger airship 104-4a may comprise a larger volume of buoyant fluid, such that airship 104-4a may provide for greater lift than airships 104-4b and 104-4c. By coupling airships 104-4b and 104-4c to airship 104-4a, airships 104-4b and 104-4c may provide for maneuverability of airship 104-4a, by applying a tensile force to tug 102, allowing airships 104-4b and 104-4c to move airship 104-4a, as smaller airships 104-4b and 104-4c may be more maneuverable of a relatively larger airship. The combination of the high-lift airship 104-4a, with low-lift, high maneuverability airships 104-4b and 104-4c, coupled through tugs 102, may result in a hybrid aircraft system comprising a high lift and high maneuverability.

Figure 4:
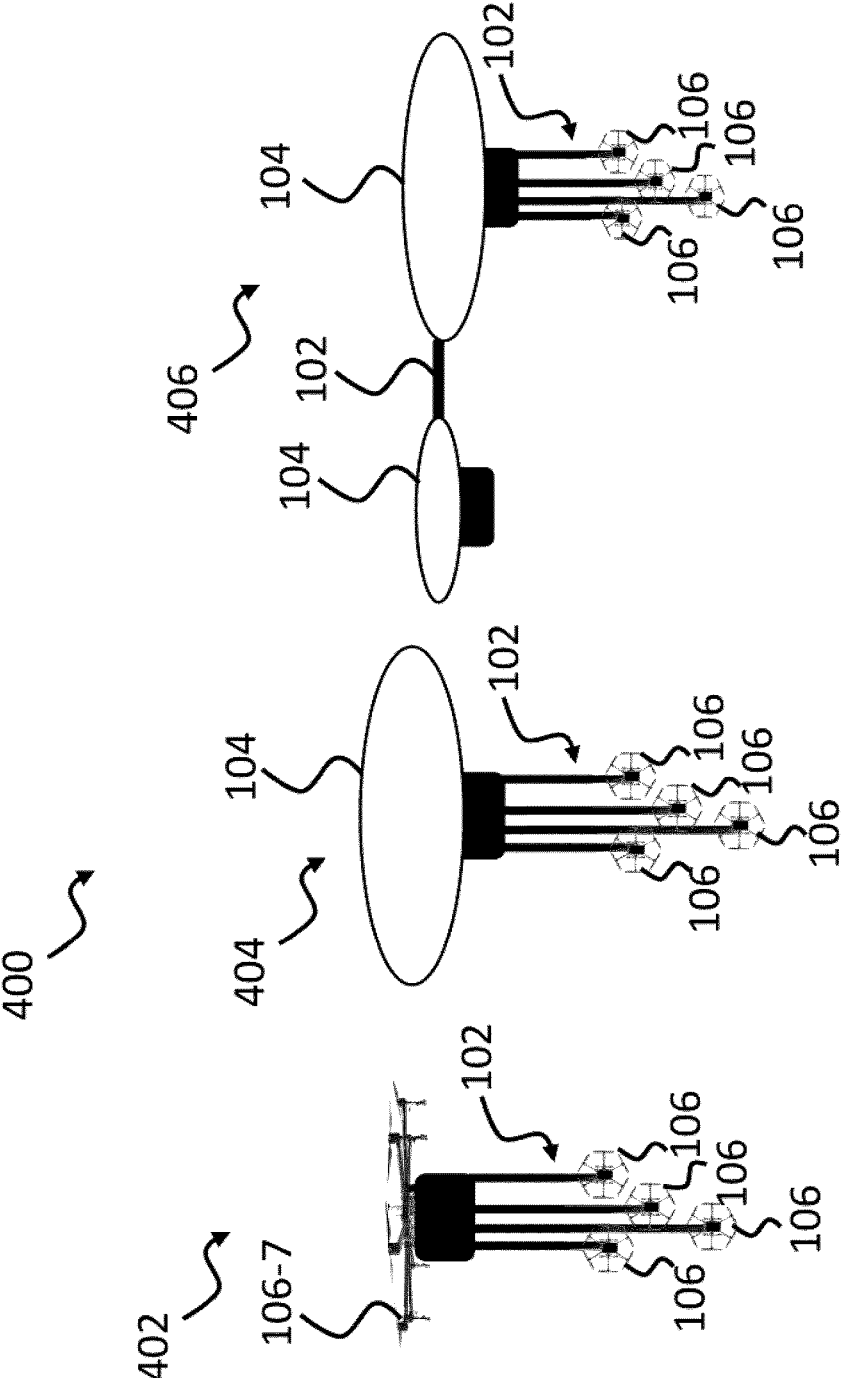
FIG. 4 is a schematic of a system for mobile towing and lifting, according to another embodiment.

Referring now to FIG. 4, pictured therein is a system 400 for drone to drone tugs. Shown in FIG. 4 are three distinct configurations (402, 404, 406) of system 400.

Configuration 402 comprises carrier UAV 106-7, as well as four UAVs 106. Carrier UAV 106-7 is configured such that the four UAVs 106 may be coupled to carrier UAV 106-7 with tugs 102. Configuration 402 may be applied to UAV retrieval or moving operations, wherein UAVs 106 are coupled to carrier UAV 106-7 for moving. In some examples, carrier UAV 106-7 may remain at altitude, and may be dispatched when needed, by a UAV 106 or individual operator. Tugs 102 of configuration 402 may be retractable, such that tugs 102 may be lowered for coupling to ground level UAVs 106 while carrier UAV 106-7 remains at altitude. In some examples, UAVs 106 may detach from a carrier UAV 106-7, perform a desired task or operation, and rendezvous with, and couple to, carrier UAV 106-7, such that UAVs 106 may be stored on, or charged by UAV 106-7, to prepare for the next required task or operation.

Configuration 404 comprises airship 104, as well as four UAVs 106. Carrier airship 104 is configured such that the four UAVs 106 may be coupled to airship 104 with tugs 102. Configuration 404 may be applied to UAV retrieval, moving, or lifting operations, wherein UAVs 106 are coupled to airship 104 for moving. In some examples, airship 104 may remain at altitude, and may be dispatched when needed, by a UAV 106 or individual operator. Tugs 102 of configuration 404 may be retractable, such that tugs 102 may be lowered for coupling to ground level UAVs 106 while airship 104 remains at altitude.

Configuration 406 comprises two airships 104, coupled via a tug 102, as well as four UAVs 106 coupled to one airship 104 via tugs 102. Carrier airship 104 is configured such that the four UAVs 106 may be coupled to one airship 104 with tugs 102. Configuration 406 may be applied to UAV retrieval, moving or lifting operations, wherein UAVs 106 are coupled to an airship 104 for moving or lifting. In some examples, airship 104 may remain at altitude, and may be dispatched when needed, by a UAV 106 or individual operator. Tugs 102 of configuration 406 may be retractable, such that tugs 102 may be lowered for coupling to ground level UAVs 106 while airship 104 remains at altitude. The use of multiple airships in configuration 406 may provide for greater propulsive and/or lifting power, allowing the airship 104 fleet to move UAVs 106 of greater mass than may have been possible to move with a single airship 104.

Figure 5:
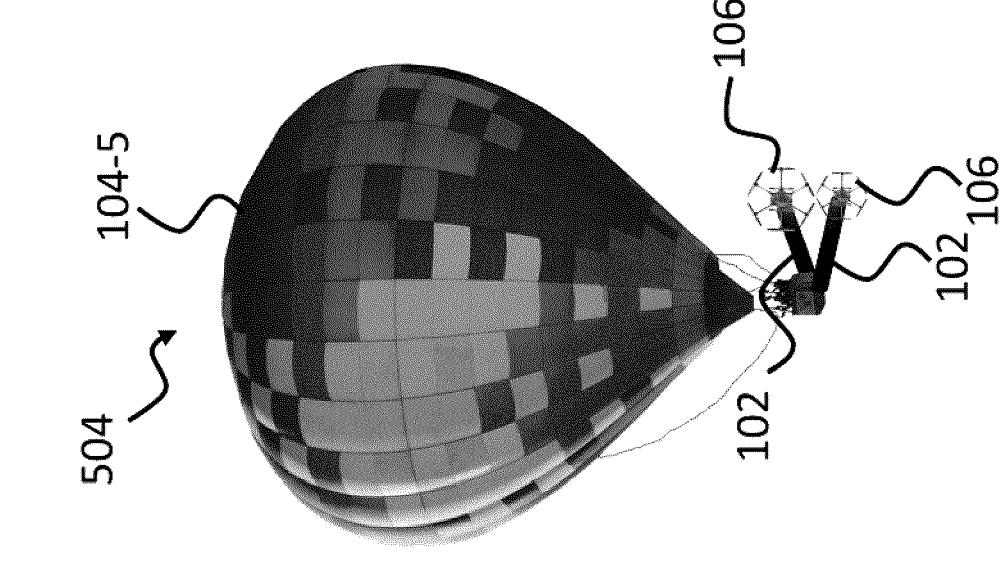
FIG. 5 is a schematic of a system for mobile towing, comprising a hybrid airship, according to an embodiment.
Figure 5:
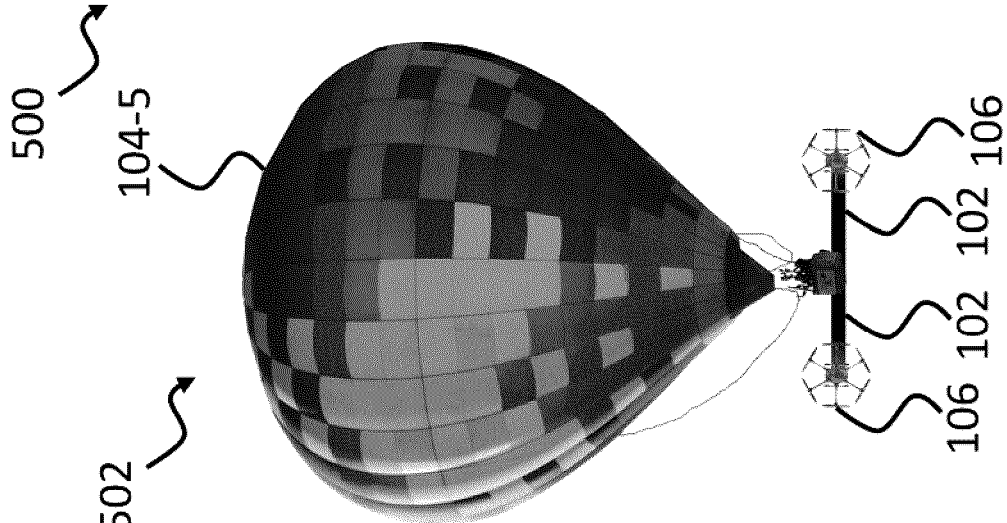

Referring now to FIG. 5, pictured therein is a system 500 for drone control system for a hot air hybrid airship 104-5. Description above in reference to systems 100 to 400 may apply to system 500. "Hybrid" refers to the property of the airship 104-5 wherein buoyancy/vertical force may be provided by hot air and/or another buoyant fluid including, without limitation, hydrogen, or helium, while in air maneuverability may be provided by UAVs coupled to the airship with tugs 102.

System 500 comprises hot air airship 104-5 and a pair of UAVs 106. UAVs 106 may be coupled to hot air airship 104-5 through tugs 102. UAVs 106 may navigate in three dimensional space using on board propulsion equipment. When UAVs 106 change position, the UAVs 106 may exert a force onto hot air airship 104-5 by applying tension to tugs 102. By directing UAVs 106 to move, UAVs 106 may control the position of hot air airship 104-5 in three dimensional space.

System 500 is shown in two configurations, 502 and 504. In configuration 502, UAVs 106 are on opposite sides of hot air airship 104-5. Such a configuration of UAV position may be desirable for stabilizing the hot air airship 104-5 at a single coordinate position.

In configuration 504, UAVs 106 are on the same side of hot air airship 104-5. Configuration 504 may be used to tow hot air airship 104-5 towards the relative direction of UAVs 106.

Tugs 102 of FIG. 5 may be configured such that electrical power and data may be transmitted between UAVs 106 and hot air airship 104-5. Hot air airships 104-5 may pass control data to UAVs 106, such that UAVs may be controlled by, or from within, hot air airship 104-5. In the system 500 of FIG. 5, each UAV 106 may be controlled individually.

Figure 6:
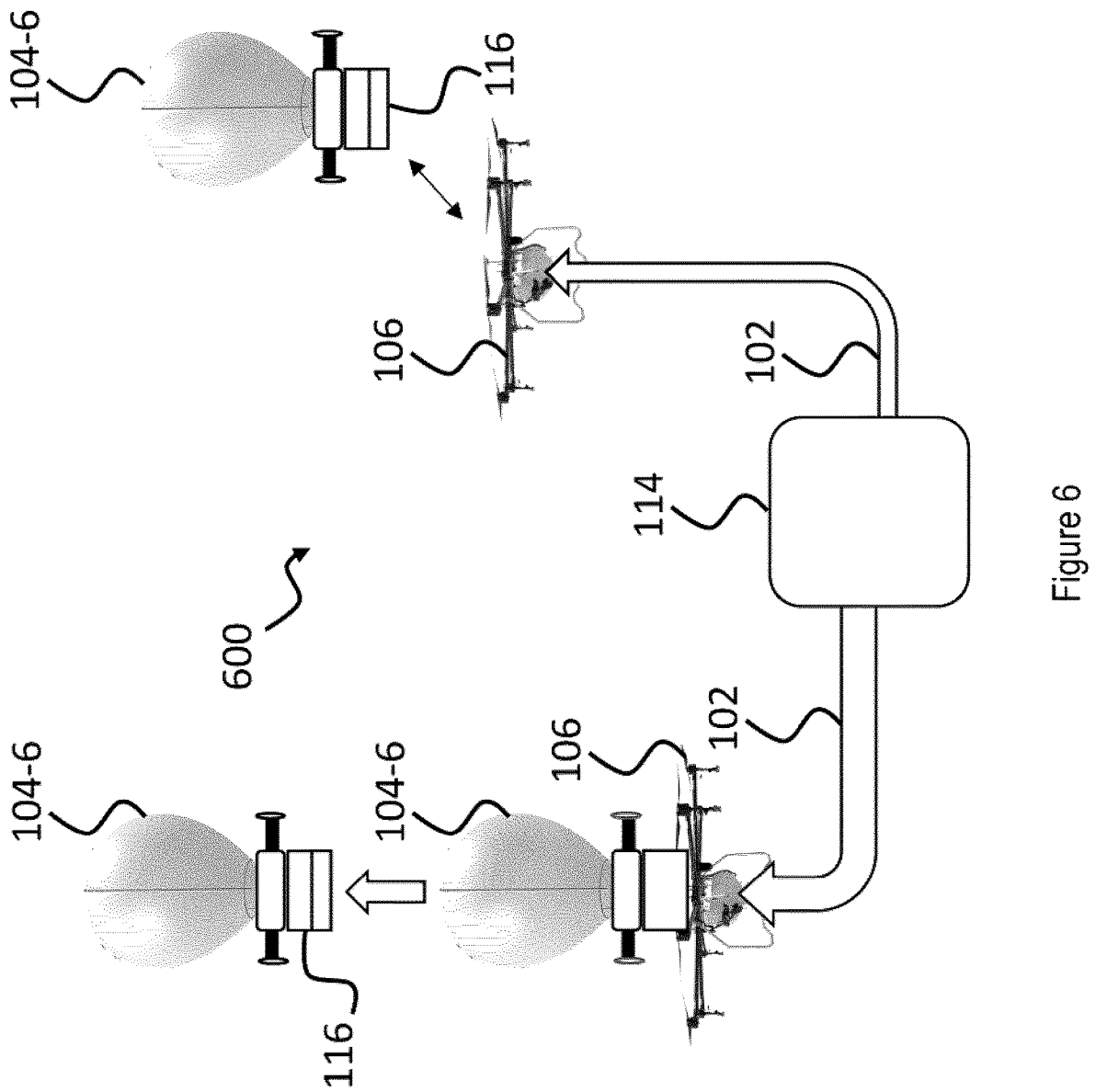
FIG. 6 is a schematic of a system for mobile fluid delivery, according to an embodiment.

Referring now to FIG. 6, pictured therein is a system 600 for provisioning fluids from a storage tank to an aerial vehicle. Description above in reference to systems 100 to 500 may apply to system 600. System 600 comprises airship 104-6, fluid tank 114, tugs 102 and UAV 106.

Airship 104-6 may comprise a fluid storage tank 116. Airship 104-6 may generate lift through the presence of a large amount of a buoyant fluid, including, without limitation, helium, hydrogen or heated air. It may be difficult to control the altitude of airship 104-6 in such examples, as it may be advantageous to maintain a relatively fixed volume of helium, as helium may be rare and expensive. To control lift and therefore altitude, the airship 104-6 may begin at ground level, with a fluid storage tank 116 full of water or another high mass fluid. The additional water mass within tank 116 results in a large enough total mass of airship 104-6 such that airship 104-6 may not generate enough lift through buoyancy to counteract the total combined weight of the airship 104-6.

To generate lift, the airship 104-6 may release water from tank 116, resulting in net lift from the reduction of combined airship 104-6 and fluid storage tank 116 weight. Once the airship 104-6 is at altitude, it may be desirable to allow for airship descent without discharging the buoyant fluid to the environment. In the example of system 600, tug 102 may comprise a fluid conduit, such that fluid may pass through tug 102. UAVs 106 may couple to fluid tank 114, with tug 102, and fill an internal cavity with fluid from tank 114. UAVs 106 may then travel to airship 104-6 in air, and couple to tank 116 of airship 104-6 with tug 102. The UAVs 106 may deposit internal fluids into fluid tank 116, through tug 102. Once fluid has been provided to tank 116 from UAV 106, the airship 104-6 increases in mass, and may subsequently descend, as the total weight of the ship may be greater than the total lift force generated by the buoyant fluid within airship 104-6. System 600 may provide an energy savings advantage, as energy may only need to be expended to transport fluid to a high altitude once by the UAV. Additionally, rare and valuable buoyant fluids, such as helium, may be preserved, reducing waste and by extension, cost.

Figure 7:
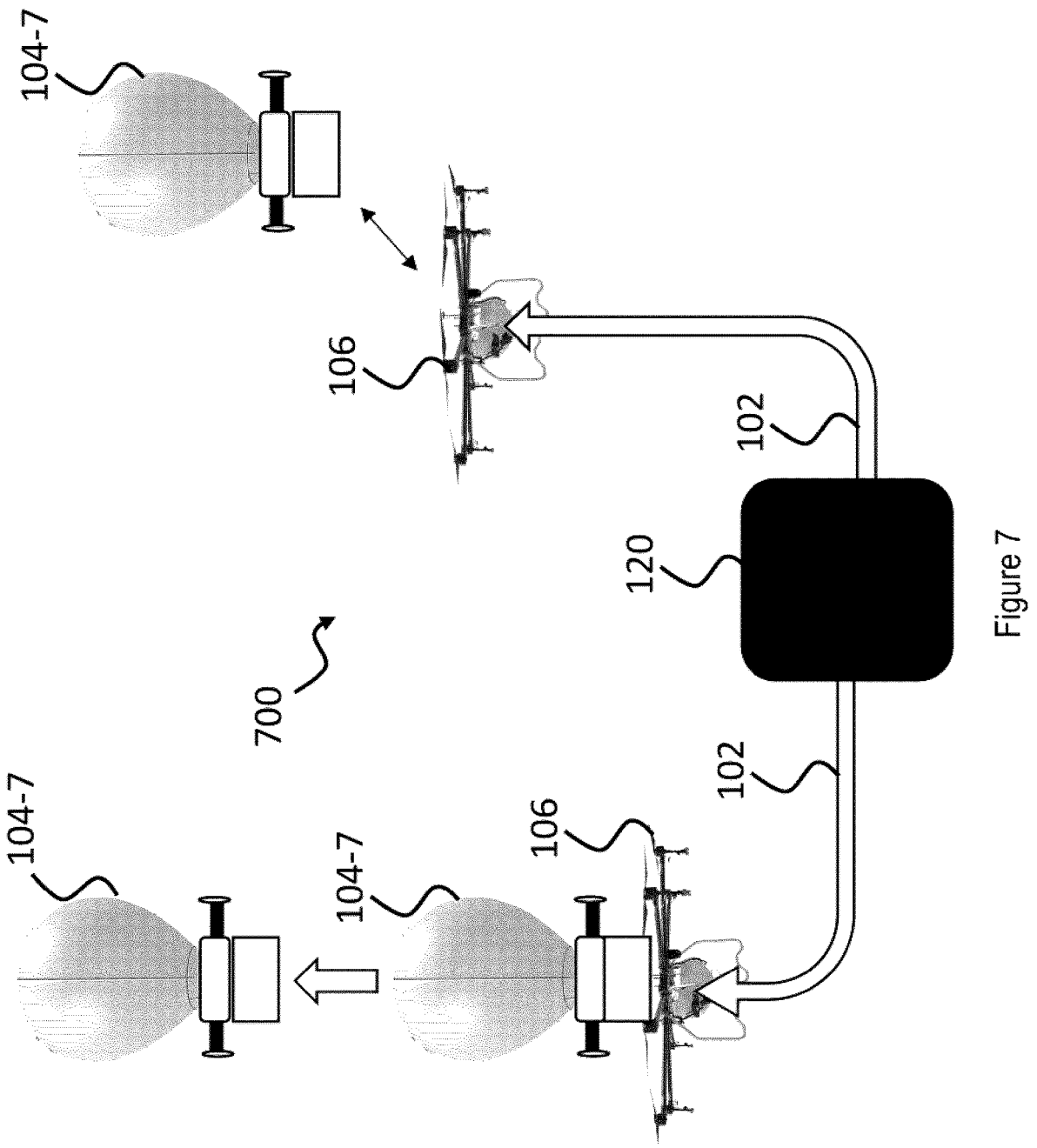
FIG. 7 is a schematic of a system for aircraft-based electric charging, according to an embodiment.

Referring now to FIG. 7, pictured therein is a system 700 for delivering electrical energy, according to an embodiment. Description above in reference to systems 100 to 600 may apply to system 700. System 700 comprises airship 104-7, electricity source 120 and UAV 106. UAV 106 may couple to electricity source 120 through tug 102. In the example of system 700, tug 102 comprises an electrical conductor, such that electrical power may be transferred through tug 102. UAVs 106 may couple to electricity source 120 through tug 102, and store electrical energy within UAV 106. The electrical energy may be stored by any means known in the art, including but not limited to, chemical batteries or the like.

The system 700 of FIG. 7 may allow airship 104-7 to receive external electrical energy while remaining at high altitude. After UAV 106 collects electrical energy from electricity source 120, UAV 106 may navigate to a position near airship 104-7, wherein airship 104-7 remains at altitude. UAV 106 may connect to airship 104-7 with tug 102 (not pictured), and transfer electrical power to airship 104-7 through tug 102, such that airship 104-7 may be supplied with energy at altitude.

Referring now to FIG. 8, pictured therein is a system 800 for delivering electrical energy, according to an embodiment. Description above in reference to systems 100 to 700 may apply to system 800. System 800 comprises charging station 122. Charging station 122 may be a mobile or fixed station, which may provide energy, including electricity, to a plurality of devices. Charging station 122 may comprise a plurality of connectors, as well as wireless electrical power transmission capabilities.

System 800 may further comprise airship 104-8, 104-9, 104-10 and a UAV 106.

Airship 104-8 may comprise a tug 102. The tug 102 in the example of system 800 may be extended from airship 104-8, such that tug 102 may connect to charging station 122. Once connected to charging station 122, airship 104-8 may receive electricity for a fixed period of time, until a certain amount of energy has been transferred, or until the internal electricity stores of airship 104-8 are full. After this charging operation, tug 102 may be disconnected from charging station 122, and tug 102 may be retracted back up to airship 104-8.

Airship 104-9 may comprise a wireless power receiver, such as a rectenna, photovoltaics or inductive coils (not pictured). In such examples, UAV 106-3 may couple to charging station 122 with tug 102. Electrical power may be transferred to UAV 106-3 from charging station 122 through tug 102. In such examples, UAV 106-3 may comprise wireless electricity transmission capabilities such as microwave, lasers, or mm-wave and/or other electromagnetic radiation for electricity transfer capabilities, inductivel coupling, magnetic coupling or any combination thereof. UAV 106-3, once coupled to charging station 122 with tug 102, may navigate to near airship 104-9, wherein airship 104-9 is at an elevated altitude. The distance between airship 104-9 and UAV 106-3 may be sufficiently small, such that wireless power may be transmitted from UAV 106-3 to airship 104-9, wherein airship 104-9 may receive wireless power from UAV 106-3 via a wireless power receiver compatible with a wireless power transmitter of the UAV 106-3.

Airship 104-10 may comprise a tug 102. The tug 102 in the example of system 800 may be extended from airship 104-10, such that tug 102 may connect to a UAV 106-4. Both UAV 106-4 and airship 104-10 may be in flight while connected by tug 102. Airship 104-10 may be maintained at a greater altitude than UAV 106-4. UAV 106-4 may comprise a wireless power receiver, such as a rectenna 124. UAV 106-4 may maintain an altitude relatively near charging station 122. Rectenna 124 of UAV 106-4 may receive wireless power from charging station 122, and transmit it to airship 104-10 through tug 102. Wireless power transmission may comprise inductive coupling, magnetic coupling, and/or other electromagnetic radiation based wireless power transmission methods (e.g. mm-wave, laser, high frequency microwaves or the like).

The system 800 of FIG. 8 allows for a fleet of UAVs to rendezvous with charging stations, such as charging station 122, and transfer power to in flight vehicles, such as airships. Such a system 800 may allow airships to remain at altitude, wherein essential services such as provision of power, data and other maintenance services may be provided by a fleet of mobile UAVs. The use of tug 102 allows for UAVs to transmit electricity more efficiently to airships, as the distance of wireless power transmission may be reduced, reducing energy losses, as such power transmissions may degrade as per the inverse square law with distance.

Some examples of system 800 may alternatively employ battery swapping, instead of charging via tug 102.

Referring now to FIG. 9, pictured therein is a system 900 comprising deployable structures, which may couple to airships. Description above in reference to systems 100 to 800 may apply to system 900.

System 900 comprises airship 104, deployable structure 126 and tug 102. Deployable structure 126 may be coupled to airship 104 through tug 104.

Deployable structure 126 may comprise an inflatable or collapsible frame (e.g. tent-pole style structural frame), and a flexible textile type material draped across the frame, such that the deployable structure 126 may be readily collapsed or reconfigured to a storage configuration, such that a relatively small amount of space is required to store the deployable structure 126.

Deployable structure 126 may be stored within airship 104, in a storage configuration. Deployable structure 126 may be deployed to increase the human capacity or cargo volume of the airship 104.

In some examples, the system 900 of FIG. 9 may be used for on demand air transportation. Deployable structure 126 may be deployed on ground. A fleet of in-air airships may be available for dispatch. An individual may dispatch an in-air airship, which may extend a retractable tug 102, such that the tug may be coupled to deployable structure 126. After coupling deployable structure 126 to airship 104 through tug 102, the airship may retract tug 102, elevating deployable structure 126. Airship may then travel to another geographical location, and extend tug 102, placing deployable structure 126 on the ground, completing the transportation of the deployable structure 126.

Referring now to FIG. 10, pictured therein is a system 1000 for charging electric vehicles. Description above in reference to systems 100 to 900 may apply to system 1000. A fleet of charging UAVs 106-5 may be in constant or regular flight. Each UAV 106-5 may comprise an energy production and/or storage device, such as, without limitation, a chemical battery, and power transfer circuitry.

System 1000 may be configured such that the owner or operator of an electric vehicle 128 may dispatch a UAV 106 fleet vehicle for charging an electric vehicle. Once an individual dispatches a charging UAV 106-5, the UAV 106-5 may navigate to the individual's position, extend a retractable tug 102 to the individual, such that the individual may connect tug 102 to the electric vehicle 126. Alternatively, the tug 102 may be configured to autonomously connect to electric vehicle 126, without physical human intervention. In some examples, the tug 102 may be instead connected to a charging target, wherein charging target comprises any device, vehicle or structure which may be charged with electrical energy.

UAV 106-5 may transfer electrical power to electric vehicle 126 though tug 102 in a charging operation. Once the charging operation is complete (e.g. the electric vehicle 126 battery is full, or the desired amount of electrical energy has been transferred), tug 102 may be disconnected from electric vehicle 126, and retracted by UAV 106-5.

Referring now to configuration 1002 of FIG. 10, UAVs 106-5 may couple to other UAVs 106-5 with tugs 102. In such configurations 1002, UAVs 106-5 may transfer power between one another to more efficiently distribute energy throughout UAV 106-5 electric vehicle charging fleet. In some examples of system 1000, power transmission or distribution between UAVs 106-5 may comprise wireless power transmission.

In some examples of system 1000 of FIG. 10, UAVs may alternatively be replaced by a fleet of airships, providing for the same functionality as the UAV based embodiment above.

Airships or UAVs of system 1000 may periodically return to a base station or charging station to charge internal energy storage devices.

In system 1000, other electric vehicles may be charged, such as, without limitation, delivery robot 130, UAVs (crewed or uncrewed), delivery drones, autonomous underwater vehicles or the like. Electric vehicles of system 1000 may be on land, water, in air or in space.

In some examples of system 1000, a fleet of UAVs 106 may be in constant aerial operation, and may periodically and autonomously reach the ground to charge when needed. System 1000 may be configured such that UAVs 106 of the fleet predict positions at which charging demand may be high at certain times, and may proactively head towards these high demand areas before demand rises. Such a system may be implemented through the analysis of historical data, including charging demand records and/or aggregate numbers of local operational vehicles.

Referring now to FIG. 11, Pictured therein is system 1100, comprising airship 104-11. Airship 104-11 may comprise deployable wings 132. Deployable wings 132 may comprise inflatable endoskeleton type structures, which may be filled with helium, hot air, hybrid gas mixtures, or other fluids. In some examples, deployable wings 132 may be deployed with the assistance of hydraulic operations, using liquids or other incompressible fluids, and or gasses.

Once deployable wings 132 are inflated or deployed, they may form aerodynamic, lift generating structures, providing additional lift capabilities to airship 104-11.

In some examples of system 1100, deployable wings 132 may comprise layers of photovoltaic materials, rectennas, metasurfaces and/or metamaterials or the like for power generation. In some examples, such layers may be deployable.

In some examples of system 1100, UAVs 106 may couple to wing tips of deployable wings 132 of airship 104-11, through tug 102. In such examples, through the application of tension to deployable wings 132 by tug 102, the structural integrity and aerodynamic performance of the deployable wings 132 may be improved (e.g. exterior shape of the wings may remain at an ideal, aerodynamic shape). In such examples, UAVs 106 and airship 104-11 may be configured such that all vehicles may communicate with one another to coordinate movement in tandem. In some examples, data and electricity may be passed through tug 102 to assist with vehicle control and the provision of power for propulsion, respectively.

Referring now to FIG. 12, pictured therein is a system 1200, comprising airship 104-12, equipped with multi-chamber deployable wings 134. System may correspond to system 1100. Multi-chamber deployable wings 134 comprise multiple internal cavities, which may each be filled with pressurized fluids to deploy the wings.

Multi-chamber deployable wings 134 may provide more flexibility than deployable wings 132. Only a subset of the multi chamber deployable wing's 134 chambers may be filled in some examples and situations. This flexibility may expand upon the use cases of airship 104-12. For examples, some uses may require that the airship 104-12 comprises a relatively small footprint. In such an example, only a subset of the chambers may be inflated, resulting in a smaller total aircraft footprint, at the cost of possible performance (for example, see configuration 1202). In other examples, greater performance may be required, and no space constraints may be present. In such examples, all chambers of multi-chamber deployable wings 134 may be deployed, for maximum possible performance (for example, see configuration 1204).

In some examples of system 1200, UAVs 106 may couple to wing tips of multi-chamber deployable wings 134 of airship 104-12, through tug 102. In such examples, through the application of tension to multi-chamber deployable wings 134 by tug 102, the structural integrity and aerodynamic performance of the multi-chamber deployable wings 134 may be improved (e.g. exterior shape of the wings may remain at an ideal, aerodynamic shape). In such examples, UAVs 106 and airship 104-12 may be configured such that all vehicles may communicate with one another to coordinate movement in tandem. In some examples, data and electricity may be passed through tug 102 to assist with vehicle control and the provision of power for propulsion, respectively. In some examples, tension of tugs 102 may be adjusted when multi-chamber deployable wings 134 are reconfigured.

Referring now to FIG. 13, Pictured therein is a system 1300 comprising airships 104 of various configurations (1302, 1304, 1306), and deployable sheet 136.

Deployable sheet 136 may be attached to a UAV 106 through tug 102 and positioned such that the sheet 136 covers the surface area of another flight vehicle, such as an airship 104. Deployable sheet 136 may comprise rectennas, photovoltaic materials, metasurfaces and/or metamaterials for energy reception and or generation respectively. In some examples, deployable sheet 136 may be inflatable and or additively manufactured. Deployable sheet 136 may comprise various shapes and sizes, and may be manufactured from any material known in the art.

Configuration 1302 comprises an airship 104 with deployable wings 132. In the example of configuration 1302, deployable sheet 136 may be draped over the body of airship 104 and deployable wings 132. Deployable sheet 136 may be held in place by tension derived from tugs 102 attached to UAVs 106.

Configuration 1304 comprises an airship 104. In the example of configuration 1304, an approximately four-sided deployable sheet 136 is draped over, at the side, or under airship 104, wherein the four most prominent corners of deployable sheet 136 are each coupled to a UAV 106. In some examples of configuration 1304, corners of deployable sheet 136 may be coupled to UAVs 106 through a tug 102.

Configuration 1306 comprises an airship 104. In the example of configuration 1306, a deployable sheet 136 may be coupled to airship 104 at one end of deployable sheet 136 through tug 102 and may trail behind or beyond the body of airship 104. The remaining free-floating end of deployable sheet may be coupled to UAVs 106, imparting tension into deployable sheet 136. In the example of configuration 1306, two UAVs are present. In other examples, more or fewer UAVs may be present.

In some examples of system 1300, UAVs 106 and airships 104 may be configured such that all vehicles may communicate with one another to coordinate movement in tandem.

System 1300 may enable wireless power reception or solar power generation capabilities to be added to aerial vehicles incapable of such operations, by draping deployable sheet 136 over incapable vehicles.

Referring now to FIG. 14, Pictured therein is a system 1400 for extra-terrestrial rover deployment, the system 1400 comprising at least one rover vehicle 138. Rover vehicle 138 may be any type of rover vehicle known in the art.

System 1400 may enable the transportation, deployment, and supply of energy to rover vehicle 138. System 1400 may further comprise at least one aircraft, such as airship 104 or UAV 106.

Airships 104 or UAVs 106 may couple to rover vehicles 138 with tug 102. Airships 104 or UAVs 106 may raise rover vehicles 138 off the ground surface of a celestial body at a first location, navigate to a second location, and lower rover vehicles 138 to the ground surface of the celestial body. In some examples, tug 102 may be extended and retracted to raise and lower coupled rover vehicles 138.

Some examples of system 1400 may comprise charging airship-drone pair 1402. The airship-drone pair 1402 may comprise an airship 104, with a plurality of UAVs 106 coupled to the airship 104 through retractable tugs 102. UAVs 106 may comprise wireless power transfer capabilities.

In some examples, airship 104 may remain at a relatively high altitude, while a rover vehicle 134 may operate on the surface of a celestial body. Airship-drone pair 1402 may be applied to provide electrical energy to the rover vehicle 138. Airship-drone pair 1402 may navigate to the location of a rover vehicle. Connected UAVs 106 may be lowered to close to the surface of the celestial body. UAVs 106 may be brought to a distance sufficiently close to rover vehicle 138, such that wireless electrical power transfer may be relatively efficient. Each UAV 106 may comprise wireless electrical power transmission capabilities, while each rover vehicle 138 may comprise a system for receiving wireless electrical power, such as a rectenna, laser or inductive coil-based system or the like. A UAV 106 may wirelessly transfer electricity to the rover vehicle 134 until a certain amount of energy has been transferred, or the energy storage capabilities of rover vehicle 134 are saturated. After the energy transfer operation is complete, UAV 106 may be retracted back to airship 104 of airship-drone pair 1402 and may then be in a ready state for a subsequent power transfer deployment.

Vehicle 1404 may comprise a main airship 104, with four other airships 104 coupled to the main airship through tugs 102. The main airship may receive wireless electricity through a system for wireless power reception, for example an array of rectennas, and transfer electricity to the other airships through tugs 102.

Referring now to FIG. 15, pictured therein is a Magnus effect-based UAV 106-6. UAV 106-6 may comprise a propeller 140, cylindrical airfoil 142, external rotation collar 144, and engine and tether point 146. UAV 106-6 may fly vertically, as well as horizontally. Cylindrical airfoil 142 may provide stabilization by rotation. External rotation collar 144 may rotate airfoil 142 when in horizontal tug flight. The UAV 106-6 may generate lift through the Magnus effect. UAV 106-6 may be further configured to comprise detachable systems and subcomponents. UAV 106-6 may be coupled to a tug 102.

Any UAV 106 referred to in the disclosure herein may comprise a Magnus effect-based UAV 106-6.

Referring now to FIG. 16, pictured therein is a system 1500, comprising a Magnus effect-based UAV 106-6, as described above in reference to FIG. 15. System 1500 comprises a Magnus-effect UAV 106-6, coupled with a deployable, retractable structure 148. Retractable structure 148 may comprise solar cells, rectenna material, metasurfaces and/or metamaterials for power harvesting and or recharging energy stores of UAV 106-6 while in-flight. Retractable structure 148 may comprise a stored configuration and a deployed configuration, wherein the deployed configuration occupies a greater volume than the stored configuration, but the deployed configuration may allow for faster energy reception or harvesting through solar cells and rectennas respectively.

Other examples of system 1500 may include pneumatic systems, and/or a mobile center structure, wherein the direction of the thrust may be adjusted by physically moving the propeller 140 to a direction to control the direction of flight. Components of system 1500 may be on a gimbal to allow for full 360-degree control.

Referring now to FIG. 17, pictured therein is UAV 106-6, and a plurality of aerodynamic wing example configurations 1600. Example aerodynamic wing configurations 1600 may comprise low wing 1602, mid wing 1604, high wing 1606, dihedral wing 1608, anhedral wing 1610, wing with wing-tips 1612, gull wing 1614, inverted gull wing 1616, upward cranked wing 1618, or downward cranked wing 1620. Magnus effect UAV 106-6 may comprise, without limitation, any aerodynamic wing configuration described herein, or other examples not shown herein.

Some implementations of UAV 106-6 may further include inflatable and/or deployable structures; powered by solar, wireless power transmission and/or propelled by jets, combustion engines, metallic fuels, electric, ion thrusters, steam and/or the like, and/or a combination of the above. UAV 106-6 may have embedded, additively manufactured and/or mounted rectenna and/or solar cells material and/or meta-surfaces and/or metamaterials or the like. Inflatable Wings may be mechanically driven for propulsion, control and/or stabilization.

Referring now to FIGS. 18, 19 and 20, shown therein is a system 1700 for mobile towing and/or lifting. System 1700 may comprise a number of configurations, including scooter towing configuration 1702, wakeboard towing configuration 1704, object removal towing configuration 1706, alpine sports towing configuration 1708, golf towing configuration 1710, carriage towing configuration 1712, toboggan towing configuration 1714, transportation vehicle towing configuration 1716, and emergency services towing configuration 1718. System 1700 may allow for towing and/or lifting as a service, and may be operated autonomously.

In all configurations, an aircraft or fleet of aircraft, for example, airships 104, may be at altitude and available for dispatch. Each aircraft may comprise a tug 102. Tug 102 may comprise a retractable tug 102, such that the tug 102 may be extended from or retracted back towards the aircraft. An individual may dispatch airship 104, for example, with a smartphone or other connected device, voice activation, and/or gesture-based actions. Airship 104 may navigate to the individual's position, and extend tug 102, such that the tug 102 is reachable by the individual at ground level, while the airship remains at altitude. At the end of tug 102 of system 1700 may be a towing connector 150, for interfacing with various systems and towing payloads 152.

Referring now to scooter towing configuration 1702, towing payload 152 may comprise an individual on a powered or unpowered scooter. An individual may dispatch system 1700, and in response, airship 104 may navigate to their position. The individual may grab on to towing connector 150 with their hands or connect towing connector 150 to the scooter, and instruct airship 104 to navigate to a location or towards a direction, providing the scooter with propulsion.

Referring now to wakeboard towing configuration 1704, towing payload 152 may comprise a wakeboard. An individual may dispatch system 1700, and in response, airship 104 may navigate to their position. The individual may grab on to towing connector 150 with their hands or connect towing connector 150 to the wakeboard, and instruct airship 104 to navigate to a location or towards a direction, providing the wakeboard with propulsion.

Referring now to object removal towing configuration 1706, towing payload 152 may comprise an unwanted heavy object, such as a fallen tree. An individual may dispatch system 1700, and in response, airship 104 may navigate to their position. The individual may grab on to towing connector 150 with their hands or connect towing connector 144 to the unwanted heavy object, and instruct airship 104 to navigate to a location or towards a direction, removing the unwanted heavy object.

Referring now to alpine sports towing configuration 1708, towing payload 152 may comprise a snowboard, skis or an individual using a snowboard or skis. An individual may dispatch system 1700, and in response, airship 104 may navigate to their position. The individual may grab on to towing connector 150 with their hands or connect towing connector 150 to the ski or snowboard, and instruct airship 104 to navigate to a location or towards a direction, providing the skier or snowboarder with propulsion. Configuration 1708 may be particularly advantageous when applied to downhill skiing or snowboarding, as alpine regions may be difficult to access without expensive infrastructure such as chairlifts, or expensive vehicles, such as private helicopters. An individual may instead request a mobile tow up a hill or mountain, using system 1700 described herein.

Referring now to golf towing configuration 1710, towing payload 152 may comprise a golf bag or golf pull cart. An individual may dispatch system 1700, and in response, airship 104 may navigate to their position. The individual may connect towing connector 150 to the golf bag or golf pull cart, and instruct airship 104 to navigate to a location or towards a direction, providing the golf cart or golf pull cart with propulsion. Such a system may provide a more flexible, and efficient alternative to powered golf carts.

Referring now to carriage towing configuration 1712, towing payload 152 may comprise a carriage, which a user may enter and sit within. An individual may dispatch system 1700, and in response, airship 104 may navigate to their position. The individual may connect towing connector 150 to the carriage, and instruct airship 104 to navigate to a location or towards a direction, providing the carriage with propulsion. Such a system may provide a more flexible, and efficient alternative to other carriage propulsion methods, such as horses, mules, electric motors or internal combustion engines.

Referring now to toboggan towing configuration 1714, towing payload 152 may comprise a toboggan. An individual may dispatch system 1700, and in response, airship 104 may navigate to their position. The individual may grab on to towing connector 150 with their hands or connect towing connector 150 to the toboggan, and instruct airship 104 to navigate to a location or towards a direction, providing the toboggan with propulsion. This may be particularly advantageous, as tobogganing may require frequent uphill treks. An individual may instead request a mobile tow up a hill or mountain, using system 1700 described herein.

In the example of configuration 1714, airship 104 comprises two airships 104 coupled with a tug 102. Such a configuration may advantageously provide more powerful towing or propulsion, such that heavier objects may be towed. Multi-airship configurations may be applied to any other mobile towing application described in the disclosure herein.

Referring now to transportation vehicle towing configuration 1716, towing payload 152 may comprise any vehicle, including cars, trucks, busses, scooters, ambulances, skateboards, baby carriages, bicycles, mountain bikes, motorcycles, fire engines, cranes, forklifts, tractors, aircraft, recycling trucks, cement mixers, dump trucks, subways, aerial tramways, helicopters, balloons, trams or other vehicles. An individual may dispatch system 1700, and in response, airship 104 may navigate to their position. The individual may connect towing connector 150 to the vehicle, and instruct airship 104 to navigate to a location or towards a direction, providing the vehicle with propulsion. Such a system may provide a more flexible, and efficient alternative to other vehicle propulsion and towing methods, such as tow trucks.

Referring now to emergency services towing configuration 1718, towing payload 152 may comprise any heavy materials that are to be removed. An individual may dispatch system 1700, and in response, airship 104 may navigate to their position. The individual may connect towing connector 150 to the towing payload 152, and instruct airship 104 to navigate to a location or towards a direction, providing the towing payload 162 with propulsion, moving the towing payload 162 away. This may be particularly advantageous, as disaster situations may result in damaged or destroyed infrastructure (e.g. roads or rail), which may limit the functionality of traditional emergency response equipment, such as tow trucks, bucket trucks, ladder trucks, and cranes. An individual may instead request a mobile tow up, and remove unwanted objects using system 1700.

In some examples of configuration 1718, the airship 104 may provide disaster relief or emergency response supplies to the individual when first arriving to the user after dispatch.

Referring now to FIG. 21, shown therein is a system 1800 for aircraft beam riding. System 1800 may comprise an airship 104, and a UAV 106 coupled to the airship through tug 102. Tug 102 may be configured such as to enable power transfer between airship 104 and UAV 106 through tug 102. UAV 106 may comprise necessary components for receiving wireless electricity, for example, a rectenna or array of rectennas or the like. Airship 104 may comprise the necessary components for receiving wireless electricity.

In operation of system 1800, airship 104 may be at altitude, detached from UAV 106. At some point during operation, airship 104 may begin to run low on electricity stores, or may have completely run out of available electrical energy. Airship 104 may dispatch UAV 106, for example, through a connected device. UAV 106 may couple to airship 104 with tug 102.

Airship 104 and UAV 106 may move in tandem through microwave beam 154. In some examples, tug 102 may transmit data between UAV 106 and airship 104, such that control data may be passed between vehicles to coordinate movements. In other examples, UAV 106 may tow airship 104 towards microwave beam 154.

Microwave beam 154 may comprise any microwave beam or other electromagnetic radiation beam which carries substantial amounts of energy. Microwave beam 154 may be transmitted by microwave transceiver 156.

Once UAV 106 is within microwave beam 154, UAV 106 may convert microwave beam energy to electrical energy using an onboard rectenna or array of rectennas, metasurfaces and/or metamaterials. UAV 106 may transmit electrical energy received through rectenna to airship 104 through tug 102.

In some examples, microwave beam 154 may be configured such that the microwave beam 154 is of a relatively long distance, and positioned between two common points of interest. In such examples, the beam riding operation described in reference to system 1800 may allow for effective charging of, or supply of energy to, airship 104, while travelling between two common points of interest (e.g. major cities).

Referring now to FIG. 22, shown therein is a system 1900 for a hybrid aircraft 160, configured for microwave power reception. Hybrid aircraft 160 may comprise airship 104. Airship 104 may be coupled to UAV 106 through tug 102. UAV 106 may provide hybrid aircraft 160 with greater maneuverability and or position control.

Airship 104 may comprise internal compartments 158 which may be individually inflated with lighter or heavier gases, allowing for greater altitude control.

Airship 104 may additionally be coupled to gas bags 164, through additional tugs 102. Gas bags 164 may enable greater buoyancy control. Gas bags 164 may be inflated (e.g. with helium, hot air or other buoyant gases), increasing aircraft buoyancy, providing hybrid aircraft 160 with greater lift than if the hybrid aircraft 160 was not equipped with gas bags 164.

Hybrid aircraft 160 may further comprise rectenna array 162. Rectenna array 162 may enable hybrid aircraft 160 to receive wireless power transmitted as microwave beams, from microwave transceiver 156, as depicted by element 112.

Referring now to FIG. 23, pictured therein is a method 2000 of mobile towing. Method 2000 comprises steps 2002, 2004, 2006, and 2008. Description above in reference to FIGS. 1 to 23 may apply to method 2000.

At step 2002, an aircraft comprising a retractable tug is provided.

At step 2004, the retractable tug is placed in the extended position.

At step 2006, a towing payload is connected to the retractable tug.

At step 2008, the retractable tug is placed in the retracted position.

Referring now to FIG. 24, pictured therein is a method 2100 of mobile charging. Method 2100 comprises steps 2102, 2104, 2106, 2108 and 2110. Description above in reference to FIGS. 1 to 23 may apply to method 2100.

At step 2102, an aircraft comprising a retractable tug is provided.

At step 2104, the retractable tug is placed in the extended position.

At step 2106, the retractable tug is connected to a charging target. The tug may remain connected until a certain amount of energy has been transferred, or until the charging target has been saturated with energy (e.g. an internal chemical battery may no longer accept any more supplied energy).

At step 2108, the retracting tug is disconnected from the charging target.

At step 2110, the retractable tug is placed in the retracted position.

While the above description provides examples of one or more apparatus, methods, or systems, it will be appreciated that other apparatus, methods, or systems may be within the scope of the claims as interpreted by one of skill in the art.

The invention claimed is:

1. A mobile towing system, comprising:
an aerial vehicle;
a retractable tug, coupled to the aerial vehicle, wherein the tug is configured to transfer electrical power to and from the aerial vehicle;
a deployable structure, coupled to the aerial vehicle via the tug, wherein the deployable structure comprises an inflatable frame and a flexible material draped across the frame.

2. The system of claim 1, wherein the tug is configured to attach to a fluid source, and the tug is configured to transfer fluid to and from the aerial vehicle.

3. The system of claim 1, wherein the tug is configured to attach to an energy source, wherein electrical energy is transferred from the energy source to the aerial vehicle through the tug.

4. The system of claim 1, wherein the deployable structure is stored within the aerial vehicle.

5. The system of claim 1, wherein the aerial vehicle is an unmanned aircraft, wherein the tug is configured to couple to an energy source, wherein electrical energy is transferred from the energy source to the unmanned aircraft.

6. The system of claim 5, wherein the unmanned aircraft and the tug are configured to transceive energy wirelessly.

7. The system of claim 5, wherein electrical energy is transferred from the energy source to the unmanned aircraft wirelessly.

8. The system of claim 1, wherein the tug comprises a first end and a second end, and each end is coupled to an aerial vehicle.

9. The system of claim 8, wherein the first end of the tug is attached to an airship.

10. The system of claim 8, wherein the first end of the tug is attached to a first unmanned aircraft, and the second end of the tug is attached to a second unmanned aircraft.

11. The system of claim 10, wherein the first unmanned aircraft is configured to tow the second unmanned aircraft by applying a tensile force to the tug.

12. The system of claim 11, wherein the first unmanned aircraft is configured to tow the second unmanned aircraft in any translational direction.

13. The system of claim 8, wherein the first end of the tug is attached to an airship, and the second end of the tug is attached to an unmanned aircraft.

14. The system of claim 13, wherein the unmanned aircraft comprises a receiver, wherein the receiver is configured to receive wireless energy, convert the wireless energy to electrical energy, and transfer electrical energy to the airship through the tug.

15. The system of claim 13, wherein the unmanned aircraft is configured to tow the airship by applying a tensile force to the tug.

16. The system of claim 15, wherein the unmanned aircraft is configured to tow the airship in any translational direction.

17. A method of mobile towing, the method comprising:

providing an aircraft comprising a retractable tug, the retractable tug comprising a retracted position and extended position, wherein the retractable tug is provided in the retracted position, wherein a deployable structure is coupled to the aircraft via the retractable tug, wherein the deployable structure comprises an inflatable frame and a flexible material draped across the frame;

placing the retractable tug in the extended position; and connecting a towing payload to the retractable tug.

18. The method of claim 17, wherein the aircraft is provided at altitude.

19. The method of claim 17 or 18, further comprising:

placing the retractable tug in the retracted position after connecting the towing payload to the retractable tug.

20. A method of mobile charging, the method comprising:

providing an aircraft comprising a retractable tug, the retractable tug comprising a retracted position and extended position, wherein the retractable tug is provided in the retracted position, wherein a deployable structure is coupled to the aircraft via the retractable tug, wherein the deployable structure comprises an inflatable frame and a flexible material draped across the frame;

placing the retractable tug in the extended position; and connecting the retractable tug to a charging target.

21. The method of claim 20, wherein the aircraft is provided at altitude.

22. The method of claim 20 or 21, further comprising:

disconnecting the retracting tug from the charging target; and placing the retractable tug in the retracted position.

* * * * *